US012572106B2

(12) United States Patent
Itoh

(10) Patent No.: US 12,572,106 B2
(45) Date of Patent: Mar. 10, 2026

(54) IMAGE FORMING APPARATUS

(71) Applicant: CANON KABUSHIKI KAISHA, Tokyo (JP)

(72) Inventor: Masatoshi Itoh, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 18/618,622

(22) Filed: Mar. 27, 2024

(65) Prior Publication Data

US 2024/0337980 A1 Oct. 10, 2024

(30) Foreign Application Priority Data

Apr. 7, 2023 (JP) ................................ 2023-062970

(51) Int. Cl.
*G03G 15/00* (2006.01)

(52) U.S. Cl.
CPC ............ *G03G 15/70* (2013.01); *G03G 15/55* (2013.01); *G03G 2215/004* (2013.01); *G03G 2215/00548* (2013.01); *G03G 2215/00599* (2013.01); *G03G 2215/00679* (2013.01)

(58) Field of Classification Search
CPC .. G03G 15/70; G03G 15/55; G03G 2215/004; G03G 2215/00548; G03G 2215/00599; G03G 2215/00679
See application file for complete search history.

(56) References Cited

U.S. PATENT DOCUMENTS 6,154,619 A * 11/2000 Boockholdt ......... G03G 15/553 399/24
10,571,845 B2 2/2020 Park et al.
11,474,458 B2 10/2022 Matsumura et al.
2002/0012553 A1* 1/2002 Endoh ................ G03G 15/0812 399/284
2008/0310865 A1* 12/2008 Uno .................. G03G 21/0011 399/167
2009/0060558 A1* 3/2009 Uehara .............. G03G 15/5004 399/88
2014/0169831 A1* 6/2014 Doshida .............. G03G 15/757 399/167

FOREIGN PATENT DOCUMENTS

JP 2021-009260 A 1/2021
JP 2021-056488 A 4/2021
JP 2021-140086 A 9/2021
JP 2021-162754 A 10/2021

OTHER PUBLICATIONS

2021056488 Machine Translation (Year: 2021).*

* cited by examiner

*Primary Examiner* — David H Banh
(74) *Attorney, Agent, or Firm* — Venable LLP

(57) ABSTRACT

An image forming apparatus includes a photosensitive member; a developing roller; a contact/separation mechanism configured to switch between a contact state in which the developing roller is brought into contact with the photosensitive member and a separation state in which the developing roller is separated from the photosensitive member; a photosensitive-member motor configured to rotate and drive the photosensitive member; and a control portion. The control portion is configured to determine that the contact/separation mechanism is in a failure state in a case where a torque of the photosensitive-member motor is not detected to have changed by at least a predetermined value within a predetermined time after a predetermined reference timing.

13 Claims, 9 Drawing Sheets

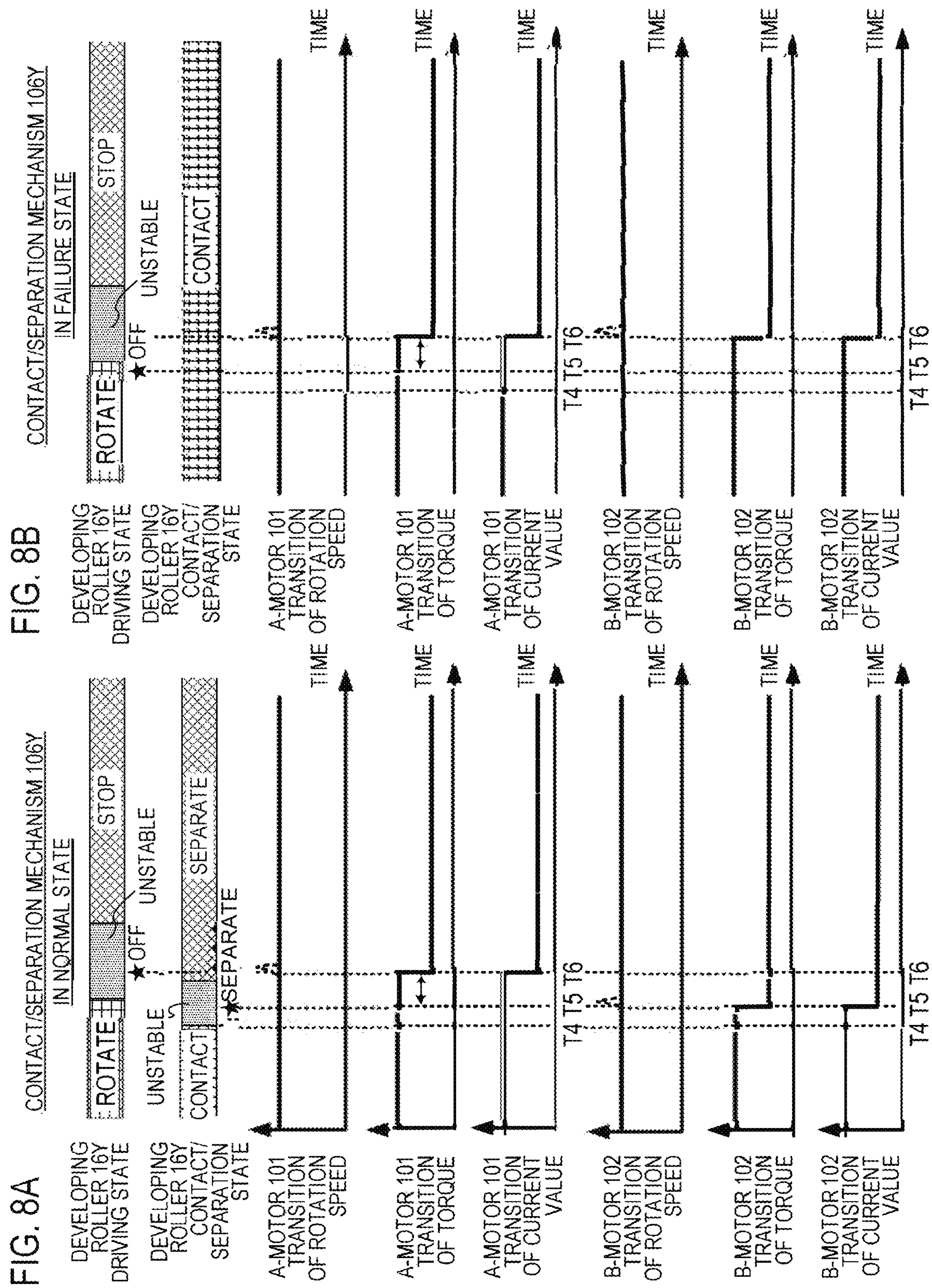

FIG. 8A
CONTACT/SEPARATION MECHANISM 106Y IN NORMAL STATE
DEVELOPING ROLLER 16Y DRIVING STATE
ROTATE
OFF
UNSTABLE
STOP
DEVELOPING ROLLER 16Y CONTACT/SEPARATION STATE
UNSTABLE
CONTACT
SEPARATE
SEPARATE
A-MOTOR 101 TRANSITION OF ROTATION SPEED
A-MOTOR 101 TRANSITION OF TORQUE
A-MOTOR 101 TRANSITION OF CURRENT VALUE
B-MOTOR 102 TRANSITION OF ROTATION SPEED
B-MOTOR 102 TRANSITION OF TORQUE
B-MOTOR 102 TRANSITION OF CURRENT VALUE
TIME
T4 T5 T6
FIG. 8B
CONTACT/SEPARATION MECHANISM 106Y IN FAILURE STATE
DEVELOPING ROLLER 16Y DRIVING STATE
ROTATE
OFF
UNSTABLE
STOP
DEVELOPING ROLLER 16Y CONTACT/SEPARATION STATE
CONTACT
A-MOTOR 101 TRANSITION OF ROTATION SPEED
A-MOTOR 101 TRANSITION OF TORQUE
A-MOTOR 101 TRANSITION OF CURRENT VALUE
B-MOTOR 102 TRANSITION OF ROTATION SPEED
B-MOTOR 102 TRANSITION OF TORQUE
B-MOTOR 102 TRANSITION OF CURRENT VALUE
TIME
T4 T5 T6

IMAGE FORMING APPARATUS

BACKGROUND OF THE INVENTION

Field of the Invention

The present invention relates to an image forming apparatus and, in particular, an electrophotographic image forming apparatus.

Description of the Related Art

In electrophotographic image forming apparatuses, photosensitive members and developing rollers are brought into contact with each other during image formation, and developers are supplied from the developing rollers to the photosensitive members. As such image forming apparatuses, configurations in which contact/separation mechanisms that cause developing rollers to be brought into contact with or separated from photosensitive members have been known.

In a case where an image forming operation is performed with contact/separation mechanisms being in a failure state, rotation of developing rollers and photosensitive members could be driven or stopped while the developing rollers and the photosensitive members are brought into contact with each other. Then, the non-rotating developing rollers and the rotating photosensitive members are brought into contact with each other to cause excessive sliding friction, which possibly results in failures or shortening of the service life of the developing rollers or the photosensitive members. In order to detect failures in contact/separation mechanisms, U.S. patent Ser. No. 10/571,845 discloses a configuration in which test patterns are formed on photosensitive members and then transferred to an intermediate transfer belt to be detected by a sensor.

SUMMARY OF THE INVENTION

However, in the configuration described above, toner is consumed to form the test patterns. Therefore, consumption of the toner is required for each failure detection for the contact/separation mechanisms.

In view of the problems described above, the present invention has an object of providing an image forming apparatus capable of detecting failures in developing contact/separation mechanisms while reducing consumption of toner.

In order to achieve the object described above, an image forming apparatus according to the present application includes:

a photosensitive member;

a developing roller;

a contact/separation mechanism configured to switch between a contact state in which the developing roller is brought into contact with the photosensitive member and a separation state in which the developing roller is separated from the photosensitive member;

a photosensitive-member motor configured to rotate and drive the photosensitive member; and a control portion, wherein the control portion is configured to determine that the contact/separation mechanism is in a failure state in a case where a torque of the photosensitive-member motor is not detected to have changed by at least a predetermined value within a predetermined time after a predetermined reference timing.

Additionally, in order to achieve the object described above, an image forming apparatus according to the present application includes:

a photosensitive member;

a developing roller;

a contact/separation mechanism configured to switch between a contact state in which the developing roller is brought into contact with the photosensitive member and a separation state in which the developing roller is separated from the photosensitive member;

a photosensitive-member motor configured to rotate and drive the photosensitive member; and a control portion, wherein the control portion is configured to determine that the contact/separation mechanism is in a failure state in a case where a difference between (i) a timing at which a torque of the photosensitive-member motor has changed by at least a predetermined value and (ii) a predetermined reference timing is smaller than a predetermined reference value.

Additionally, in order to achieve the object described above, an image forming apparatus according to the present application includes:

a photosensitive member;

a developing roller;

a contact/separation mechanism configured to switch between a contact state in which the developing roller is brought into contact with the photosensitive member and a separation state in which the developing roller is separated from the photosensitive member;

a photosensitive-member motor configured to rotate and drive the photosensitive member; and a control portion, wherein the control portion is configured to provide notification of information associated with a state of the contact/separation mechanism by a notifier in a case where a torque of the photosensitive-member motor is not detected to have changed by at least a predetermined value within a predetermined time after a predetermined reference timing.

Additionally, in order to achieve the object described above, an image forming apparatus according to the present application includes:

a photosensitive member;

a developing roller;

a contact/separation mechanism configured to switch between a contact state in which the developing roller is brought into contact with the photosensitive member and a separation state in which the developing roller is separated from the photosensitive member;

a photosensitive-member motor configured to rotate and drive the photosensitive member; and a control portion, wherein the control portion is configured to provide notification of information associated with a state of the contact/separation mechanism by a notifier in a case where a difference between (i) a timing at which a torque of the photosensitive-member motor has changed by at least a predetermined value and (ii) a predetermined reference timing is smaller than a predetermined reference value.

According to the present invention, it is possible to provide an image forming apparatus capable of detecting failures in developing contact/separation mechanisms while reducing consumption of toner.

Further features of the present invention will become apparent from the following description of exemplary embodiments with reference to the attached drawings.

BRIEF DESCRIPTION OF THE DRAWINGS

FIGS. 8A and 8B are explanatory diagrams of operations of motors during a separation operation according to a second embodiment.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments are not intended to limit the scope of the invention to the following embodiments. A plurality of features are described in each of the following embodiments, but all of these features are not essential for the invention, and these features may be arbitrarily combined.

First Embodiment

Image Forming Apparatus

Figure 1:
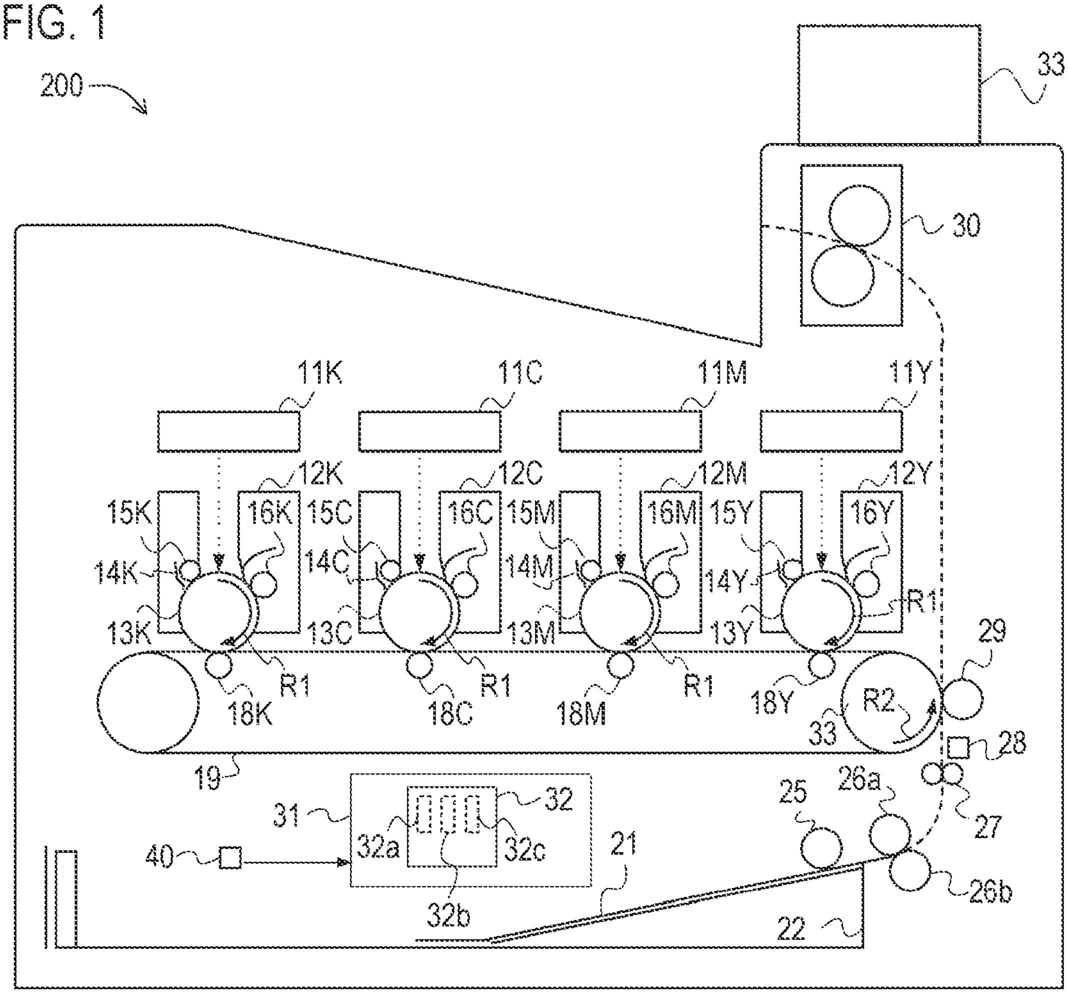
FIG. 1 is a schematic cross-sectional diagram of an image forming apparatus according to a first embodiment.

First, the schematic configuration of an image forming apparatus 200 according to a first embodiment of the present invention will be described with reference to FIG. 1. FIG. 1 is a schematic cross-sectional diagram showing the schematic configuration of the image forming apparatus 200. The image forming apparatus 200 is a tandem-type color image forming apparatus using an electrophotographic process.

The image forming apparatus 200 is configured to be capable of outputting full-color images by superimposing toner of four colors yellow (Y), magenta (M), cyan (C), and black (K) one upon another. Hereinafter, suffixes Y, M, C, and K given to symbols to show that they are elements representing the respective colors will be omitted and comprehensively described when they are not required to be particularly distinguished from each other.

The image forming apparatus 200 includes laser scanners 11 (11Y, 11M, 11C, and 11K) and cartridges 12 (12Y, 12M, 12C, and 12K) for image formation of the respective colors. Each of the cartridges 12 (12Y, 12M, 12C, and 12K) includes a photosensitive member 13 (13Y, 13M, 13C, or 13K), a photosensitive-member cleaner 14 (14Y, 14M, 14C, or 14K), and a charging roller 15 (15Y, 15M, 15C, or 15K). In addition, each of the cartridges 12 (12Y, 12M, 12C, and 12K) includes a developing device having a developing roller 16 (16Y, 16M, 16C, or 16K).

The photosensitive member (photosensitive drum) 13 is an image bearing member that is configured to be rotatable in a rotating direction R1 shown in FIG. 1, and that has a toner image corresponding to each color formed on its outer peripheral surface. The photosensitive-member cleaner 14 is a cleaning member that is arranged to contact and clean an outer peripheral surface of the photosensitive member 13. The charging roller 15 is a charging member that is arranged to contact the outer peripheral surface of the photosensitive member 13, and that charges the photosensitive member 13. The developing roller 16 is a developing member that is provided to be capable of being brought into contact with or separated from the outer peripheral surface of the photosensitive member 13, and that supplies toner (developer) to a surface of the photosensitive member 13.

The image forming apparatus 200 includes an endless intermediate transfer belt 19 that is arranged to contact all the photosensitive members 13. Further, the image forming apparatus 200 includes primary transfer rollers 18 (18Y, 18M, 18C, and 18K) that are arranged opposed to the photosensitive members 13 (13Y, 13M, 13C, and 13K), respectively, with the intermediate transfer belt 19 held therebetween. Around each of the photosensitive members 13, the photosensitive-member cleaner 14, the charging roller 15, the developing roller 16, and the primary transfer roller 18 are sequentially arranged in the rotating direction R1.

As will be described later, the image forming apparatus 200 includes an A-motor 101, a B-motor 102, and a C-motor 103 as its driving sources. The A-motor 101 is a developing motor that rotates the developing rollers 16Y, 16M, 16C, and 16K. The B-motor 102 is a photosensitive-member motor that rotates the photosensitive members 13Y, 13M, and 13C. The C-motor 103 is a motor that serves as a belt motor and a photosensitive-member motor to rotate both the intermediate transfer belt 19 and the photosensitive member 13K. In the first embodiment, all the A-motor 101, the B-motor 102, and the C-motor 103 are DC brushless motors. Further details about the driving mechanism of the image forming apparatus 200 will be described later. Note that the number of motors, the corresponding relationships between the motors and rollers, and the driving mechanism of the rollers are not necessarily limited to the configuration described above in the application of the present invention.

Further, the image forming apparatus 200 includes a cassette 22 in which sheets 21 are stored, a sheet feeding roller 25, separation rollers 26*a* and 26*b*, resist rollers 27, a conveyance sensor 28, a secondary transfer roller 29, a fixing unit 30, and a belt roller 34. In FIG. 1, a conveyance path for the sheets 21 along which the sheets 21 are discharged to the outside of the image forming apparatus 200 after being fed from the cassette 22 is shown by dotted lines.

The sheet feeding roller 25 feeds the sheets 21 from the cassette 22, and the separation rollers 26*a* and 26*b* separate the sheets 21 fed from the sheet feeding roller 25 one by one. The conveyance sensor 28 is provided downstream of the resist rollers 27 and upstream of the secondary transfer roller 29 in a conveyance direction of the sheets 21, and detects whether the sheets 21 have passed through the conveyance path. The belt roller 34 is arranged on an inner side of the intermediate transfer belt 19 like the primary transfer rollers 18, and configured to be rotatable in an arrow R2 direction shown in FIG. 1. The secondary transfer roller 29 is arranged opposed to the belt roller 34 with the intermediate transfer belt 19 held therebetween. The belt roller 34 holds and conveys the sheets 21 with the secondary transfer roller 29 via the intermediate transfer belt 19. The fixing unit 30 is a fixing apparatus that thermally fixes an image having been transferred from the intermediate transfer belt 19 to the sheets 21.

A printer control portion (controller) 31 of the image forming apparatus 200 is composed of a central processing unit (CPU) 32 including a ROM 32*a*, a RAM 32*b*, a timer 32*c*, or the like, various input/output control circuits (not shown), or the like. Further, the image forming apparatus 200 includes a display panel 33 that displays various information according to signals transmitted from the CPU 32. Further, the image forming apparatus 200 includes an environment-temperature sensor 40 that measures the environment temperature of outside air. In the first embodiment, the image forming apparatus 200 is capable of performing settings of respective conditions in image forming operations according to environment temperatures measured by the environment-temperature sensor 40.

Image Forming Operation

Next, an electrophotographic process that is an image forming operation by the image forming apparatus 200 will be described. First, the outer peripheral surface of the photosensitive member 13 is evenly charged by the charging roller 15 at a dark place inside a cartridge 12. Next, when the laser scanner 11 applies laser light modulated according to image data to the outer peripheral surface of the photosensitive member 13, charges are removed from a spot to which the laser light has been applied, and an electrostatic latent image is formed on the outer peripheral surface of the photosensitive member 13. Then, toner is supplied to the photosensitive member 13 from the developing roller 16 retaining a certain amount of the toner. When the toner adheres to the electrostatic latent image on the outer peripheral surface of the photosensitive member 13, a toner image corresponding to each color is formed on the outer peripheral surface of the photosensitive member 13.

The toner image having been formed on the surface of the photosensitive member 13 is transferred onto the intermediate transfer belt 19 at a primary transfer nip portion formed between the photosensitive member 13 and the primary transfer roller 18. By a primary transfer bias applied to the primary transfer roller 18, the toner image is attracted from the photosensitive member 13 onto the intermediate transfer belt 19.

An image forming timing in each cartridge 12 and a transfer timing of a toner image onto the intermediate transfer belt 19 are controlled by the CPU 32. When toner images of the respective colors are sequentially transferred onto the intermediate transfer belt 19, a full-color image is formed on the intermediate transfer belt 19.

On the other hand, the sheets 21 inside the cassette 22 are conveyed to the resist rollers 27 one by one by the sheet feeding roller 25 and the separation rollers 26*a* and 26*b*. After that, the sheets 21 having been conveyed to the resist rollers 27 are conveyed to a secondary transfer nip portion formed between the secondary transfer roller 29 and the belt roller 34. A toner image formed on the intermediate transfer belt 19 is transferred onto the sheets 21 having been conveyed to the secondary transfer nip portion. The sheets 21 onto which the toner image has been transferred are conveyed to the fixing unit 30, and the toner image on the sheets 21 is heated and fixed by the fixing unit 30. The sheets 21 to which the toner image has been fixed are discharged to the outside of an apparatus body of the image forming apparatus 200, and the image forming operation is completed.

Motor Configuration

Next, the motor control portion 120 that controls the operations of the motors that are driving sources for the photosensitive members 13 and the developing rollers 16 and the structures of the motors will be described. The A-motor 101, the B-motor 102, and the C-motor 103 are configured to be the same as each other. Hereinafter, details about the A-motor 101 will be described, and descriptions of the B-motor 102 and the C-motor 103 will be omitted.

Figure 2:
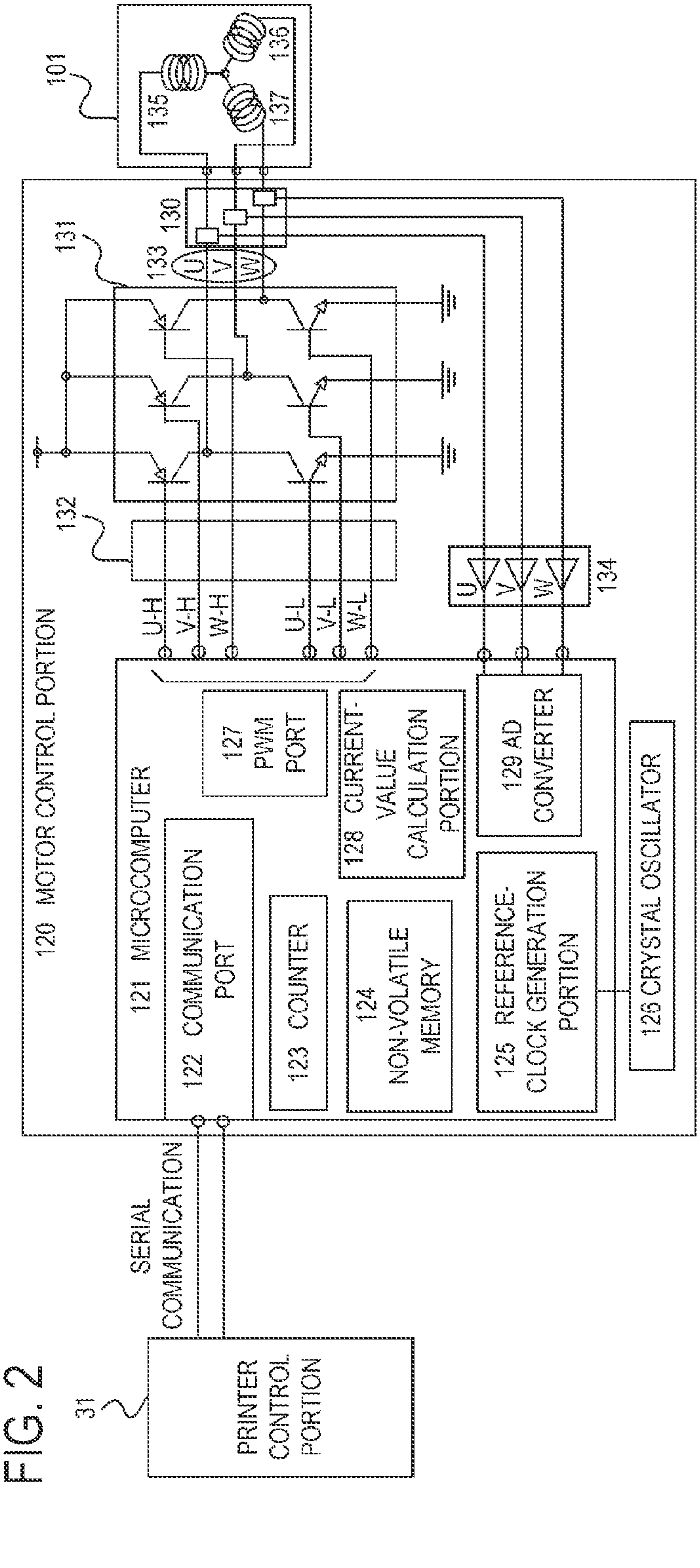
FIG. 2 is an explanatory diagram of a motor control portion according to the first embodiment.

First, the motor control portion 120 will be described with reference to FIG. 2. FIG. 2 is a diagram showing the configuration of the motor control portion 120, and shows a circuit configuration for rotating the A-motor 101.

The motor control portion 120 includes a microcomputer 121 as its computation processing means. In the microcomputer 121, a communication port 122, a counter 123, a non-volatile memory 124, a reference-clock generation portion 125, a PWM port 127, a current-value calculation portion 128, and an AD converter 129 are embedded.

The communication port 122 performs serial communication with a printer control portion 31. The printer control portion 31 controls an operation of the A-motor 101 by controlling the motor control portion 120 through serial communication. The counter 123 performs a counting operation on the basis of a reference clock generated by the reference-clock generation portion 125, and performs measurement of the cycle of a pulse input according to the count value, generation of a PWM signal, or the like.

The PWM port 127 includes six terminals, and outputs PWM signals of three high-side signals (U-H, V-H, and W-H) and three low-side signals (U-L, V-L, and W-L). The motor control portion 120 includes a three-phase inverter 131 composed of three high-side switching elements and three low-side switching elements. As the switching elements, transistors or FETs are, for example, available. The respective switching elements are connected to the PWM port 127 via a gate driver 132. Further, the respective switching elements are capable of controlling ON/OFF according to PWM signals output from the PWM port 127. The respective switching elements are assumed to be turned ON when the PWM signals are at an H-level and turned OFF when the PWM signals are at an L-level.

A UVW-phase output 133 of the inverter 131 is connected to coils 135, 136, and 137 of the A-motor 101, and capable of controlling coil currents flowing to the respective coils 135, 136, and 137. Further, the coil currents flowing to the respective coils 135, 136, and 137 are detected by a current detection portion. The current detection portion is composed of a current sensor 130, an amplifier portion 134, the AD converter 129, and the current-value calculation portion 128.

Coil currents flowing to the coils 135, 136, and 137 are converted into voltages by the current sensor 130. The voltages are subjected to amplification and application of an offset voltage by the amplifier portion 134, and input to the AD converter 129 of the microcomputer 121. For example, when the current sensor 130 outputs a voltage of 0.01 V per ampere and the amplifier portion 134 has an amplification ratio of 10 times and applies an offset voltage of 1.6 V, the amplifier portion 134 has an output voltage of 0.6 to 2.6 V in a case where a current of −10 A to +10 A flows.

The AD converter 129 outputs, for example, a voltage of 0 to 3 V as an AD value of 0 to 4095. Accordingly, the AD value becomes approximately 819 to 3549 when a current of −10 A to +10 A flows. Note that the polarity of a current is assumed to be positive when the current flows from the three-phase inverter 131 to the A-motor 101.

The current-value calculation portion 128 applies predetermined computation to AD-converted data (hereinafter described as an AD value) to calculate a current value. The current-value calculation portion 128 subtracts an offset value from an AD value, and further multiplies the subtracted AD value by a predetermined coefficient to calculate a current value. In the first embodiment, the offset value is an AD value of an offset voltage 1.6 V, approximately 2184, and the coefficient is approximately 0.00733. As the offset value, an AD value where coil currents do not flow is used. The AD value where the coil currents do not flow is read and stored in advance. The coefficient is stored in advance in the non-volatile memory 124 as a standard coefficient.

When the three-phase inverter 131 is controlled via the gate driver 132 by the microcomputer 121, currents flow to the coils 135, 136, and 137 of the A-motor 101. The microcomputer 121 calculates the rotor position and the speed of the A-motor 101 from the currents flowing to the coils 135, 136, and 137 detected by the current detection portion. By such a configuration, the microcomputer 121 is enabled to control the rotation of the A-motor 101. Further, the rotation of the B-motor 102 and the C-motor 103 is also controlled by the same control configuration.

Figure 3:
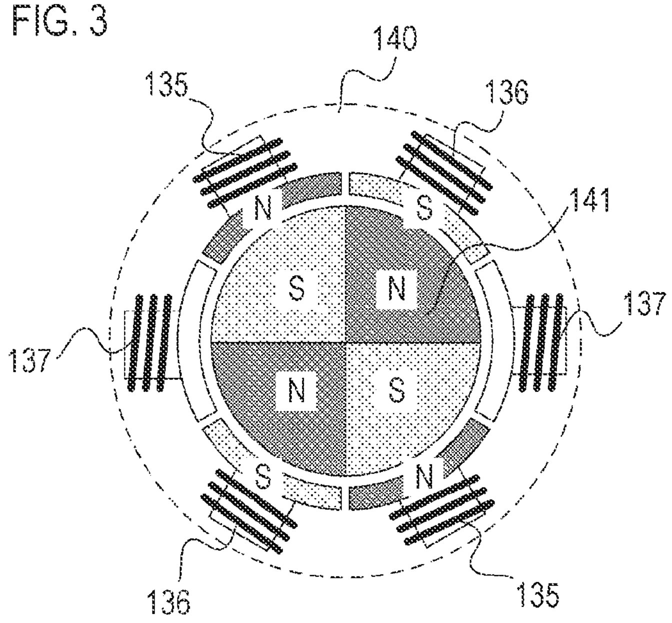
FIG. 3 is an explanatory diagram of an A-motor according to the first embodiment.

Next, the structure of the A-motor 101 will be described with reference to FIG. 3. FIG. 3 is an explanatory diagram showing the structure of the A-motor 101. The A-motor 101 is composed of a six-slot stator 140 and rotors 141 of four poles. The stator 140 includes the respective coils 135, 136, and 137 of a U-phase, a V-phase, and a W-phase. The rotors 141 are composed of permanent magnets, and include two pairs of N and S poles. The respective coils 135, 136, and 137 of the U-phase, the V-phase, and the W-phase are connected to inverter outputs.

Driving Mechanism

Figure 4:
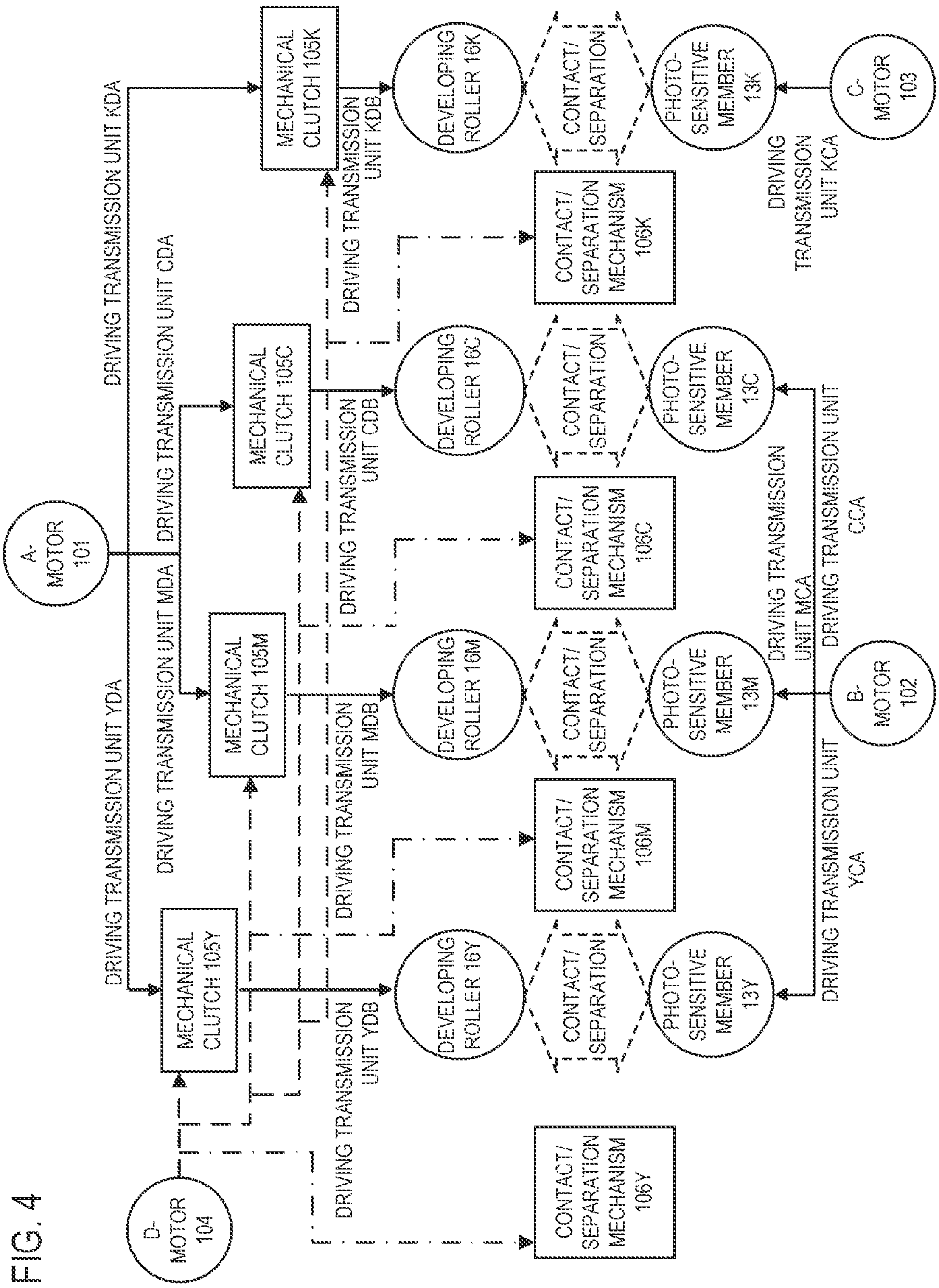
FIG. 4 is an explanatory diagram of a driving mechanism according to the first embodiment.

Next, a driving mechanism for the developing rollers 16 and the photosensitive members 13 will be described with reference to FIG. 4. FIG. 4 is an explanatory diagram of the driving mechanism for the developing rollers 16 and the photosensitive members 13. The driving mechanism includes driving trains that rotate and drive the developing rollers 16, driving trains that rotate and drive the photosensitive members 13, and contact/separation mechanisms 106 that cause the developing rollers 16 to be brought into contact with or separated from the photosensitive members 13.

First, the driving trains that rotate and drive the developing rollers 16 will be described. The developing rollers 16Y, 16M, 16C, and 16K are rotated and driven by a driving force of the A-motor 101. A driving train that transmits the driving force of the A-motor 101 to the developing roller 16Y includes driving transmission means YDA that is connected to the A-motor 101, driving transmission means YDB that is connected to the developing roller 16Y, and a mechanical clutch 105Y that connects the driving transmission means YDA and YDB to each other. The mechanical clutch 105Y is configured to be switchable to a driving transmission state in which transmission of the driving force is possible or a driving cut-off state in which the transmission of the driving force is not possible. The driving transmission means YDA and YDB are, for example, gear trains composed of a plurality of gears. The driving force that rotates and drives the developing roller 16Y is transmitted from the A-motor 101 to the developing roller 16Y via the driving transmission means YDA, the mechanical clutch 105Y, and the driving transmission means YDB. When the mechanical clutches 105 are in the driving cut-off state, the driving force is not transmitted to the developing rollers 16 even if the A-motor 101 rotates. That is, the driving trains for driving the developing rollers 16 are configured to be switchable to the driving transmission state in which the transmission of the driving force is possible or the driving cut-off state in which the transmission of the driving force is not possible by the mechanical clutches 105.

Driving trains that transmit the driving force of the A-motor 101 to the developing rollers 16M, 16C, and 16K are configured to be the same as the driving train that transmits the driving force of the A-motor 101 to the developing roller 16Y. That is, the driving force that rotates and drives the developing roller 16M is transmitted from the A-motor 101 to the developing roller 16M via driving transmission means MDA, a mechanical clutch 105M, and driving transmission means MDB. Further, the driving force that rotates and drives the developing roller 16C is transmitted from the A-motor 101 to the developing roller 16C via driving transmission means CDA, a mechanical clutch 105C, and driving transmission means CDB. Further, the driving force that rotates and drives the developing roller 16K is transmitted from the A-motor 101 to the developing roller 16K via driving transmission means KDA, a mechanical clutch 105K, and driving transmission means KDB.

Next, the driving trains that rotate and drive the photosensitive members 13 will be described. The photosensitive members 13Y, 13M, and 13C are rotated and driven by a driving force of the B-motor 102, and the photosensitive member 13K is rotated and driven by a driving force of the C-motor 103. A driving train that transmits the driving force of the B-motor 102 to the photosensitive member 13Y includes driving transmission means YCA that is connected to the B-motor 102 and the photosensitive member 13Y. The driving transmission means YCA is, for example, a gear train composed of a plurality of gears. The driving force that rotates and drives the photosensitive member 13Y is transmitted from the B-motor 102 to the photosensitive member 13Y via the driving transmission means YCA.

Driving trains that transmit the driving force of the B-motor 102 to the photosensitive members 13M and 13C and a driving train that transmits the driving force of the C-motor 103 to the photosensitive member 13K are configured to be the same as the driving train that transmits the driving force of the B-motor 102 to the photosensitive member 13Y. That is, the driving force that rotates and drives the photosensitive member 13M is transmitted from the B-motor 102 to the photosensitive member 13M via driving transmission means MCA. Further, the driving force that rotates and drives the photosensitive member 13C is transmitted from the B-motor 102 to the photosensitive member 13C via driving transmission means CCA. Further, the driving force that rotates and drives the photosensitive member 13K is transmitted from the C-motor 103 to the photosensitive member 13K via driving transmission means KCA.

Next, the contact/separation mechanisms 106 (106Y, 106M, 106C, and 106K) will be described. The contact/separation mechanisms 106 cause the developing rollers 16 to relatively move with respect to the photosensitive members 13 to be brought into contact with or separated from the photosensitive members 13. That is, the developing rollers 16 are configured to be switchable to a contact state in which the developing rollers 16 are brought into contact with the photosensitive members 13 or a separation state in which the developing rollers 16 are separated from the photosensitive members 13 by the contact/separation mechanisms 106.

Further, the image forming apparatus 200 includes a D-motor 104 that performs the switching of the developing rollers 16 between the contact state and the separation state by the contact/separation mechanisms 106 and the switching of the mechanical clutches 105 between the driving transmission state and the driving cut-off state. The D-motor 104 is a stepping motor that is capable of controlling a rotating position. When the D-motor 104 rotates and a rotational phase (posture) of the D-motor 104 changes, the switching of the developing rollers 16 between the contact state and the separation state and the switching of the mechanical clutches 105 between the driving transmission state and the driving cut-off state are performed.

Contact/Separation Operation

Figure 5:
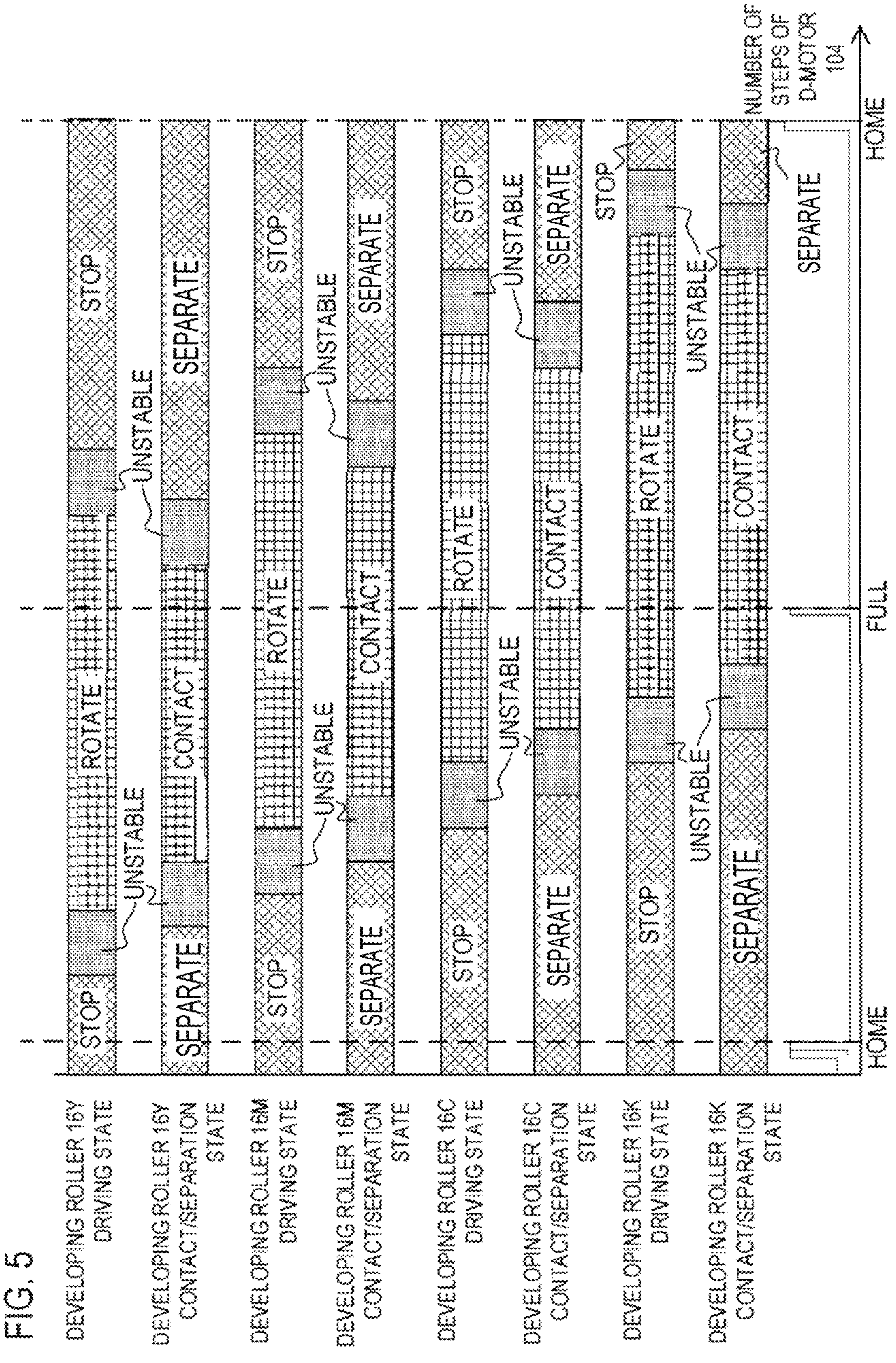
FIG. 5 is an explanatory diagram of a contact/separation operation according to the first embodiment.

Next, details about a contact/separation operation of the developing rollers 16 by the driving mechanism will be described. FIG. 5 is an explanatory diagram of the contact/separation operation of the image forming apparatus 200. In FIG. 5, a horizontal axis shows the number of steps of the D-motor 104, and corresponds to the rotational phase (position) of the D-motor 104. FIG. 5 shows a situation in which the driving states and the contact/separation states of the developing rollers 16Y, 16M, 16C, and 16K change according to a change in the number of steps (a change in the rotational phase) of the D-motor 104.

The D-motor 104 is equipped with a position sensor (not shown) to detect its HOME position. In the first embodiment, when the D-motor 104 is situated in the HOME position, all the developing rollers 16Y, 16M, 16C, and 16K are in a non-rotating and stop state and are also in a separation state in which the developing rollers 16Y, 16M, 16C, and 16K are separated from the photosensitive members 13. The printer control portion 31 recognizes the rotational phase of the D-motor 104 at the timing when a signal from the position sensor is detected as the HOME position.

When the D-motor 104 rotates from the HOME position, a cam (not shown) rotates to perform the switching of the driving states and the contact/separation states of the developing rollers 16. That is, in the first embodiment, the driving states and the contact/separation states of the developing rollers 16 are determined according to the rotational phase of the D-motor 104. In order to switch the developing rollers 16 to a desired state, the D-motor 104 situated in the HOME position is only required to operate by a predetermined number of steps and rotate at a predetermined rotation angle.

When the photosensitive members 13 and the developing rollers 16 are brought into contact with each other with only one of the photosensitive members 13 and the developing rollers 16 rotating, excessive sliding friction is produced, which possibly causes failures or shortening of the service life of the photosensitive members 13 or the developing rollers 16. In view of this problem, respective rotation and driving of the developing rollers 16 and the photosensitive members 13 are started while the developing rollers 16 and the photosensitive members 13 are separated from each other, and then the developing rollers 16 and the photosensitive members 13 are caused to be brought into contact with each other. That is, in a contact operation of the developing rollers 16 with respect to the photosensitive members 13, the developing rollers 16 are switched from a separation state to a contact state after being switched from a stop state to a rotation state. Further, the developing rollers 16 and the photosensitive members 13 are caused to be separated from each other while being brought into contact with each other, and then the rotation and driving of the developing rollers 16 and the photosensitive members 13 are stopped. That is, in a separation operation of the developing rollers 16 with respect to the photosensitive members 13, the developing rollers 16 are switched from a rotation state to a stop state after being switched from a contact state to a separation state.

For example, when starting an image forming operation, the D-motor 104 is rotation-controlled to be set in a FULL position from the HOME position, and all the developing rollers 16Y, 16M, 16C, and 16K are switched to a rotation state and a contact state in which the developing rollers 16Y, 16M, 16C, and 16K are brought into contact with the photosensitive members 13. At this time, the developing roller 16Y is first switched to a driving state and a contact state as the D-motor 104 rotates. As the D-motor 104 continues to further rotate, the switching of the developing roller 16M to a rotation state and a contact state, the switching of the developing roller 16C to a rotation state and a contact state, and the switching of the developing roller 16K to a rotation state and a contact state are sequentially performed.

On the other hand, when ending an image forming operation, the D-motor 104 is rotation-controlled to be set in the HOME position from the FULL position, and all the developing rollers 16Y, 16M, 16C, and 16K are switched to a stop state and a separation state in which the developing rollers 16Y, 16M, 16C, and 16K are separated from the photosensitive members 13. At this time, the developing roller 16Y is first switched to a separation state and a stop state as the D-motor 104 rotates. As the D-motor 104 continues to further rotate, the switching of the developing roller 16M to a separation state and a stop state, the switching of the developing roller 16C to a separation state and a stop state, and the switching of the developing roller 16K to a separation state and a stop state are sequentially performed.

Execution of an image forming operation in conjunction with the operation of the D-motor 104 described above enables a reduction in a rotation time and a contact time of the developing rollers 16 as well as a reduction in a first printout time (FPOT). In the long term, extension of the service life of the developing rollers 16 is made possible.

Note that switching timings of the driving states and the contact/separation states of the developing rollers 16 could slightly fluctuate depending on manufacturing errors or assembling errors of the mechanical clutches 105 or the driving transmission means, backlash between gears, or the like. Accordingly, the driving states and the contact/separation states of the developing rollers 16 that change according to the number of steps of the D-motor 104 have unstable regions in design as shown in FIG. 5. Actual switching of the driving states and the contact/separation states of the developing rollers 16 is performed within the unstable regions.

As described above, the driving states and the contact/separation states have the unstable regions in design. For example, in a contact operation, each of the mechanisms is configured so that the switching of the developing roller 16Y to a rotation state is not performed after the switching of the developing roller 16Y to a contact state. That is, in the image forming apparatus 200, the orders of performing the respective switching operations are secured by the number of steps of the D-motor 104 so as not to be reversed from the orders originally intended.

The execution of the contact/separation operations in the manner described above enables a reduction in a rotation time and a contact/separation time of the developing rollers 16. However, in a case where a separation operation is, for example, not normally performed due to occurrence of failures in the contact/separation mechanisms 106, the developing rollers 16 stop their rotation and driving but are not separated from the photosensitive members 13. Accordingly, the photosensitive members 13 and the developing rollers 16 are brought into contact with each other with the photosensitive members 13 rotating and the developing rollers 16 not rotating. Therefore, excessive sliding friction is produced between the photosensitive members 13 and the developing rollers 16, which possibly causes failure or shortening of the service life of the photosensitive members 13 or the developing rollers 16.

In view of this problem, the image forming apparatus 200 according to the first embodiment is configured to be capable of detecting occurrence of abnormality in the contact/separation states of the developing rollers 16 due to failures in the contact/separation mechanisms 106. Hereinafter, a failure detection method for the contact/separation mechanisms 106 by the image forming apparatus 200 will be described. Note that an operation example of the developing roller 16Y and the contact/separation mechanism 106Y will be mainly described below, but failure detection is also possible in the same manner for the developing rollers 16M, 16C, and 16K and the contact/separation mechanisms 106M, 106C, and 106K.

Figure 6A:
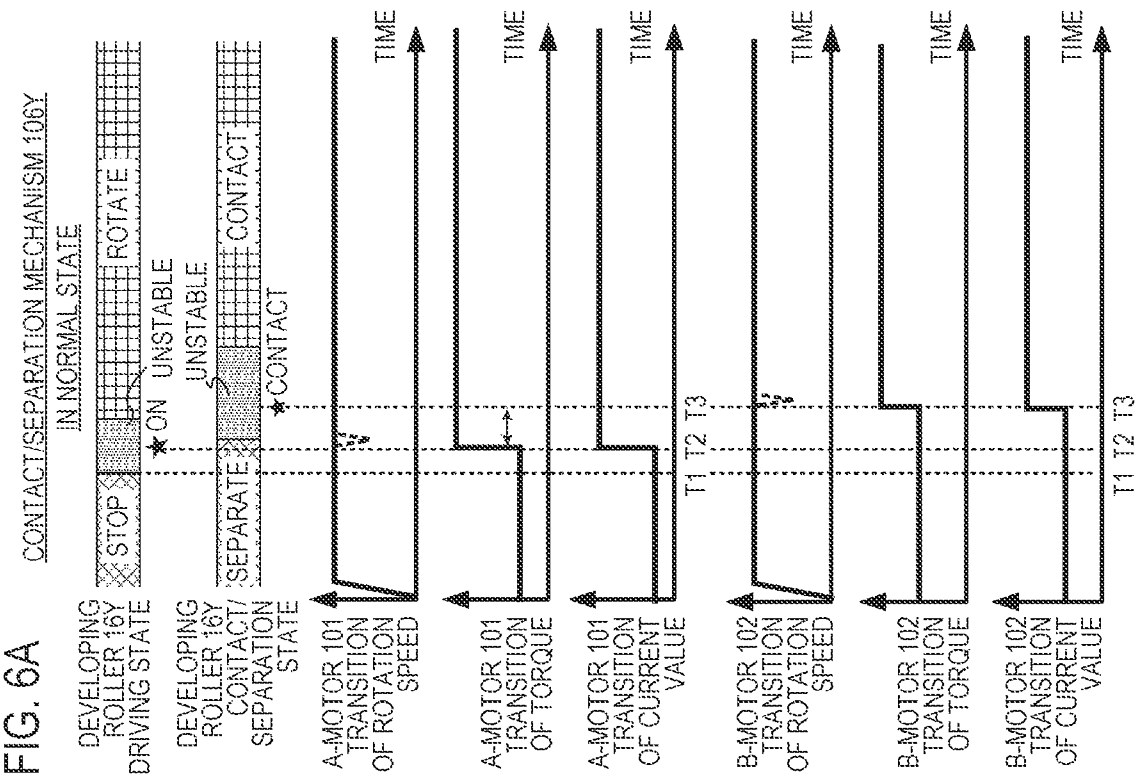
FIGS. 6A and 6B are explanatory diagrams of operations of motors during a contact operation according to the first embodiment.
Figure 6B:
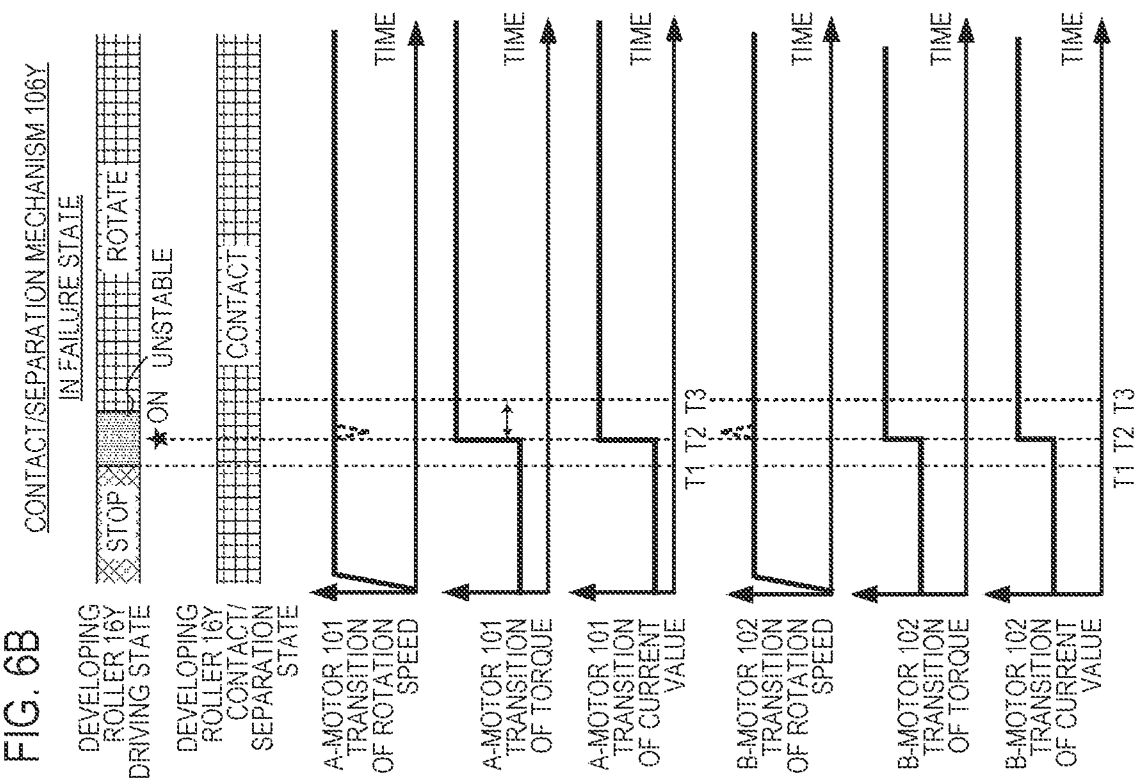

In the image forming apparatus 200 according to the first embodiment, failures in the contact/separation mechanisms 106 are detected on the basis of a torque change timing of the B-motor 102 or the C-motor 103 that drives the photosensitive members 13 in the contact operations of the developing rollers 16 that are performed when an image forming operation starts. First, the operations of the A-motor 101 and the B-motor 102 in the contact operation of the developing roller 16Y will be described. FIG. 6A shows the operations of the A-motor 101 and the B-motor 102 in the contact operation performed when the contact/separation mechanism 106Y is in a normal state. FIG. 6B shows the operations of the A-motor 101 and the B-motor 102 in the contact operation performed when the developing roller 16Y is not normally separated due to a failure in the contact/separation mechanism 106Y.

In upper parts of FIGS. 6A and 6B, the driving state and the contact/separation state of the developing roller 16Y that change according to the number of steps of the D-motor 104 are shown. In lower parts of FIGS. 6A and 6B, transitions of rotation speeds, transitions of torques, and transitions of current values of the A-motor 101 and transitions of rotation speeds, transitions of torques, and transitions of current values of the B-motor 102 are shown. In FIGS. 6A and 6B, horizontal axes of graphs that show the transitions of the respective parameters of the motors are times, and the driving states and the contact/separations states of the developing roller 16Y at the times are shown in the upper parts. Here, the current values of the motors indicate current values flowing to the coils (winding) of the motors, and have a correlation with the torques of the motors. In the image forming apparatus 200, the current values of the motors are detectable by the current detection portion described above.

Contact Operation of Contact/Separation Mechanism in Normal State

First, the operations of the A-motor 101 and the B-motor 102 in the contact operation of the developing roller 16Y performed when the contact/separation mechanism 106Y is in a normal state will be described with reference to FIG. 6A. When an image forming operation starts, the switching of the developing roller 16Y from a separation state to a contact state is performed after the switching of the developing roller 16Y from a stop state to a rotation state as the contact operation of the developing roller 16Y.

In the contact operation, rotation of the D-motor 104 is first started with activation of the A-motor 101. At this point, driving of the mechanical clutch 105Y is in a cut-off state, and a driving force of the A-motor 101 is not transmitted to the developing roller 16Y. In the contact operation, the speed of the A-motor 101 is controlled so that a transition of a rotation speed becomes constant.

When the number of steps of the D-motor 104 reaches a predetermined value, the driving state of the developing roller 16Y becomes unstable in design. Hereinafter, the time when the driving state of the developing roller 16Y becomes unstable will be represented as a time T1.

At the time T1, the B-motor 102 has been already activated, and the photosensitive member 13Y has started its rotation. In the contact operation, the speed of the B-motor 102 is controlled so that a transition of a rotation speed becomes constant.

After that, when the number of steps of the D-motor 104 increases, the driving of the mechanical clutch 105Y is switched from the cut-off state to a transmission state. Then, the driving force of the A-motor 101 is transmitted to the developing roller 16Y via the driving train including the mechanical clutch 105Y, and the developing roller 16Y is switched from a stop state to a rotation state. Hereinafter, the time when the driving state of the developing roller 16Y is switched from a stop state to a rotation state will be represented as a time T2.

A torque of the A-motor 101 that drives the developing roller 16Y increases at the time T2 with the switching of the driving state of the developing roller 16Y. Further, the torque of the A-motor 101 has a correlation with a current value, and a current value of the A-motor 101 also changes at the time T2. Note that the rotation speed of the A-motor 101 could temporarily change at the time T2 as indicated by dotted lines in FIG. 6A.

On the other hand, the developing roller 16Y and the photosensitive member 13Y are separated from each other at the time T2. Accordingly, a torque and a current value of the B-motor 102 do not change at the time T2.

When the number of steps of the D-motor 104 further increases, the contact/separation state of the developing roller 16Y becomes unstable in design. After that, the developing roller 16Y is switched from a separation state to a contact state by the contact/separation mechanism 106Y. Hereinafter, the time when the contact/separation state of the developing roller 16Y is actually switched from a separation state to a contact state will be represented as a time T3.

The photosensitive member 13Y receives a force from the developing roller 16Y when the developing roller 16Y and the photosensitive member 13Y are brought into contact with each other. Therefore, the torque of the B-motor 102 that drives the photosensitive member 13Y changes at the time T3. At this time, the torque of the B-motor 102 decreases if the rotation speed of the developing roller 16Y is faster than the rotation speed of the photosensitive member 13Y. On the other hand, the torque of the B-motor 102 increases if the rotation speed of the developing roller 16Y is slower than the rotation speed of the photosensitive member 13Y. At the time T3, the current value of the B-motor 102 also changes like the torque of the B-motor 102. Further, the rotation speed of the B-motor 102 could temporarily change at the time T3 as indicated by dotted lines in FIG. 6A.

The contact operation is completed when the developing roller 16Y is switched to the rotation state and the contact state through the operations described above. When the contact/separation mechanism 106Y is in a normal state, the timing when the driving state of the developing roller 16Y is switched is the time T2, and the timing when the contact/ separation state of the developing roller 16Y is switched is the time T3. As for the number of steps of the D-motor 104, a predetermined difference is made between the number of steps for switching the driving state of the developing roller 16Y and the number of steps for switching the contact/separation state of the developing roller 16Y. Therefore, a predetermined time difference is made between the time T2 and the time T3. That is, when the contact/separation mechanism 106Y is in a normal state, at least a predetermined time difference is made between the torque change timing of the A-motor 101 and the torque change timing of the B-motor 102.

Contact Operation of Contact/Separation Mechanism in Failure State

Next, the operations of the A-motor 101 and the B-motor 102 in the contact operation of the developing roller 16Y performed when the contact/separation mechanism 106Y is in a failure state will be described with reference to FIG. 6B. In this operation example, a next contact operation starts in a state in which the developing roller 16Y is not separated from the photosensitive member 13Y in a separation operation due to occurrence of a failure in the contact/separation mechanism 106Y.

In the contact operation, rotation of the D-motor 104 is first started with activation of the A-motor 101. At this point, driving of the mechanical clutch 105Y is in a cut-off state, and a driving force of the A-motor 101 is not transmitted to the developing roller 16Y. On the other hand, the photosensitive member 13Y starts its rotation with activation of the B-motor 102. Therefore, excessive sliding friction is produced between the developing roller 16Y and the photosensitive member 13Y.

Then, as shown in FIG. 6B, the driving state of the developing roller 16Y becomes unstable at a time T1 like when the contact/separation mechanism 106Y is in a normal state. After that, the developing roller 16Y is switched from a stop state to a rotation state while being in contact with the photosensitive member 13Y at a time T2.

Since the developing roller 16Y is switched from the stop state to the rotation state, a torque of the A-motor 101 that drives the developing roller 16Y increases at the time T2. Further, the torque of the A-motor 101 has a correlation with a current value, and the current value of the A-motor 101 also changes at the time T2. The changes in the torque and the current value of the A-motor 101 at the time T2 are the same as when the contact/separation mechanism 106Y is in the normal state. Further, the rotation speed of the A-motor 101 could temporarily change at the time T2 as indicated by dotted lines in FIG. 6B.

On the other hand, when the contact/separation mechanism 106Y is in a failure state, a torque and a current value of the B-motor 102 also change at the time T2. This is because the photosensitive member 13Y and the developing roller 16Y have been brought into contact with each other at the time T2, and a force that the photosensitive member 13Y receives from the developing roller 16Y changes with the start of rotation of the developing roller 16Y. Accordingly, at the time T2, the current value of the B-motor 102 also changes, and the rotation speed of the B-motor 102 could also temporarily change as indicated by dotted lines in FIG. 6B. That is, in a case where the developing roller 16Y has not been properly separated in a prior separation operation, the time T2 becomes the timing when torques of both the A-motor 101 and the B-motor 102 change.

When the number of steps of the D-motor 104 further increases, the time reaches T3. At the time T3, the developing roller 16Y is normally in a separation state and switched to a contact state. However, in this operation example, the photosensitive member 13Y and the developing roller 16Y have been brought into contact with each other before the time T3 due to occurrence of a failure in the contact/separation mechanism 106Y, and switching of the contact/separation state of the developing roller 16Y is not performed. Accordingly, the torque and the current value of the B-motor 102 do not change at the time T3.

As described above, in a case where the photosensitive member 13Y and the developing roller 16Y are brought into contact with each other at all times due to occurrence of a failure in the contact/separation mechanism 106Y, the torque change timing of the A-motor 101 and the torque change timing of the B-motor 102 become almost the same. That is, the torque change timing of the B-motor 102 in the contact operation of the developing roller 16Y varies depending on the presence or absence of occurrence of a failure in the contact/separation mechanism 106Y. Further, a predetermined time difference is made between the torque change timing of the A-motor 101 and the torque change timing of the B-motor 102 in a case where the contact/separation mechanism 106Y is in a normal state, but is not almost generated between the torque change timing of the A-motor 101 and the torque change timing of the B-motor 102 in a case where the contact/separation mechanism 106Y is in a failure state.

Similarly, the torque change timing of the B-motor 102 in a contact operation of the developing roller 16M (16C) varies depending on the presence or absence of occurrence of a failure in the contact/separation mechanism 106M (106C). In a case where the photosensitive member 13M (13C) and the developing roller 16M (16C) are brought into contact with each other at all times due to occurrence of a failure in the contact/separation mechanism 106M (106C), the torque change timing of the A-motor 101 and the torque change timing of the B-motor 102 become almost the same. Further, the torque change timing of the C-motor 103 in a contact operation of the developing roller 16K varies depending on the presence or absence of occurrence of a failure in the contact/separation mechanism 106K. In a case where the photosensitive member 13K and the developing roller 16K are brought into contact with each other at all times due to occurrence of a failure in the contact/separation mechanism 106K, the torque change timing of the A-motor 101 and the torque change timing of the C-motor 103 become almost the same.

Failure Detection Method for Contact/Separation Mechanisms

As described above, the torque change timings of the B-motor 102 and the C-motor 103 in the contact operation vary depending on the presence or absence of occurrence of failures in the contact/separation mechanisms 106. Therefore, in the first embodiment, the presence or absence of occurrence of failures in the contact/separation mechanisms 106 is determined on the basis of the timing when the torque of the A-motor 101 has changed by at least a predetermined value and the timing when the torque of the B-motor 102 or the C-motor 103 has changed by at least a predetermined value in a contact operation. More specifically, in the first embodiment, when the torque of the B-motor 102 or the C-motor 103 is not detected to have changed by at least a predetermined value within a predetermined time after the torque change timing of the A-motor 101, it is determined that the contact/separation mechanisms 106 are in a failure state. Hereinafter, a specific example of failure detection for the contact/separation mechanisms 106 by the image forming apparatus 200 will be described.

In the first embodiment, the image forming apparatus 200 is configured to perform failure detection for the contact/separation mechanisms 106 in a contact sequence of the developing rollers 16 when an image forming operation starts. In the contact sequence, the contact operations of the developing rollers 16Y,16M, 16C, and 16K are performed. Further, in the first embodiment, current values having a correlation with the torques of the motors are used to detect the torque change timings of the respective motors.

Figure 7:
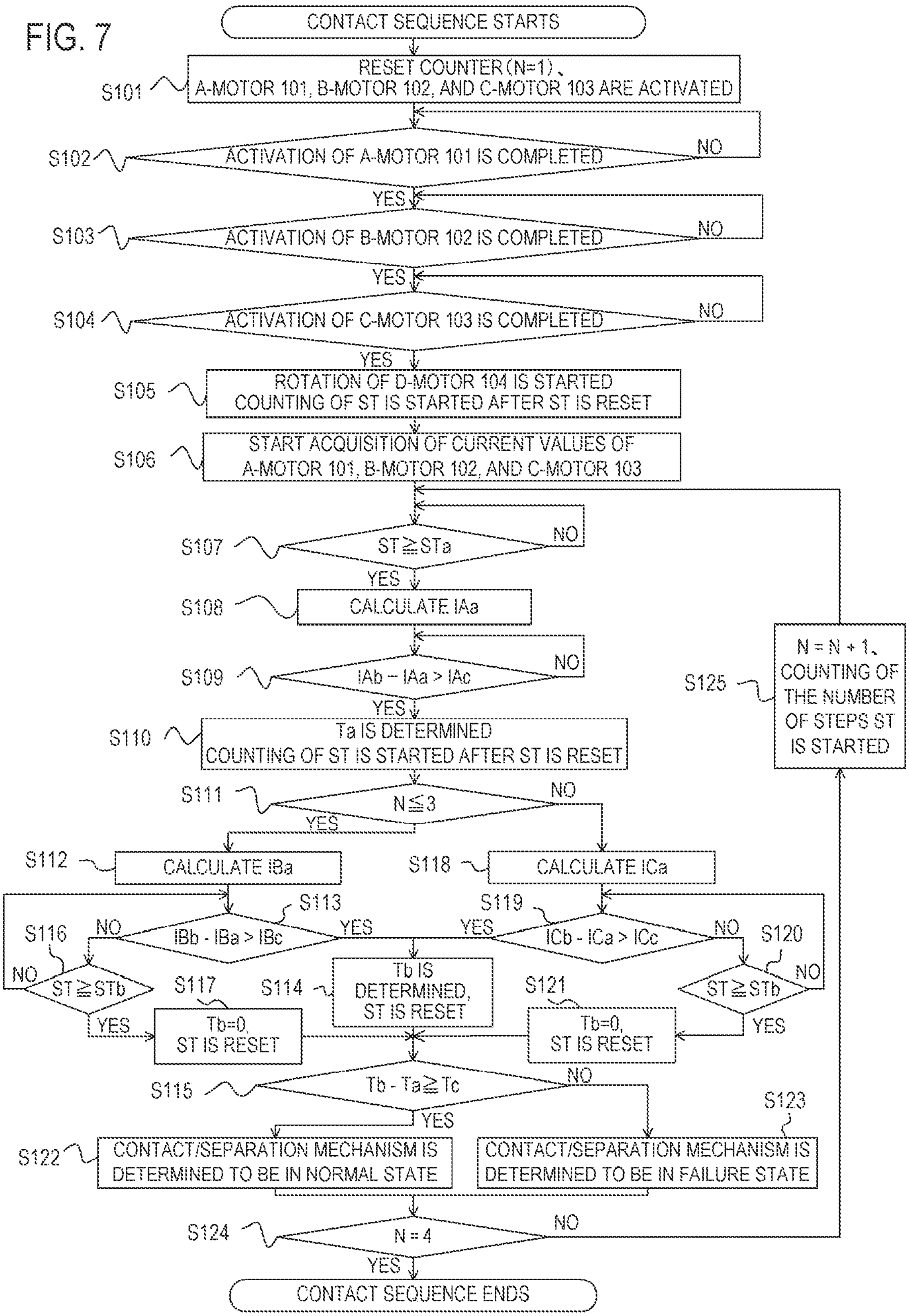
FIG. 7 is a flowchart of a contact sequence according to the first embodiment.

The contact sequence of the developing rollers 16 including failure detection for the contact/separation mechanisms 106 will be described with reference to FIG. 7. FIG. 7 is a flowchart of the contact sequence of the image forming apparatus 200.

When the contact sequence starts, a counter is reset to $N=1$ as an initial setting and the A-motor 101, the B-motor 102, and the C-motor 103 are activated in step S101 ("step" will hereinafter be denoted by S). Here, a count number N is a count number used to determine any of the developing rollers 16 that is to perform a contact operation. For example, the contact operation of the developing roller 16Y is performed when $N=1$, and the contact operation of the developing roller 16K is performed when $N=4$.

When the activation of the A-motor 101 is completed in S102, the activation of the B-motor 102 is completed in S103, and the activation of the C-motor 103 is completed in S104, rotation of the D-motor 104 is started in S105. Further, in S105, counting of the number of steps ST of the D-motor 104 is started after the number of steps ST is reset to $ST=0$.

Next, in S106, the CPU 32 starts acquisition of current values of the A-motor 101, the B-motor 102, and the C-motor 103. Then, the D-motor 104 continues to rotate until the number of steps ST reaches the number of steps STa at which an unstable region starts. Here, the number of steps STa at which the unstable region starts refers to the number of steps at which the unstable region starts in the driving state of a developing roller 16 in the switching operation of the developing roller 16 from a stop state to a rotation state. When the number of steps ST reaches the number of steps Sta at which the unstable region starts to obtain $ST \geq STa$ (YES in S107), an average value IAa of currents of the A-motor 101 in a section from $ST=0$ to $ST=STa$ is calculated in S108.

After that, in S109, the CPU 32 calculates a moving average value IAb of currents of the A-motor 101 in 10 ms for each fixed time. Then, the CPU 32 determines whether the difference between the moving average value IAb and the average value IAa of the A-motor 101 has exceeded a reference value IAc that is a current threshold set in advance. The reference value IAc may be set on the basis of an experimental value, an analysis value, or the like. That is, in the first embodiment, a change amount of a current value having a correlation with a torque of the A-motor 101 is monitored to detect a switching timing of the developing roller 16 from a stop state to a rotation state. During $IAb-IAa \leq IAc$ (NO in S109), the CPU 32 determines that the developing roller 16 remains stopped, and performs calculation of the moving average value IAb for each fixed time and comparison between the difference between the moving average value IAb and the average value IAa and the reference value IAc.

When the D-motor 104 continues to rotate to obtain $IAb-IAa>IAc$ (YES in S109), the time when $IAb-IAa>IAc$ is determined as a time Ta in S110. That is, the time Ta is the timing when the torque of the A-motor 101 has changed by at least a predetermined value. Further, the time Ta corresponds to the time when the developing roller 16 has started its rotation by a driving force of the A-motor 101. Then, in S110, counting of the number of steps ST is started after the number of steps ST is reset to $ST=0$.

Next, in S111, the CPU 32 determines whether the count number N is not more than 3. When $N \leq 3$ (YES in S111), the developing roller 16 that is under the contact operation is any of the developing rollers 16Y, 16M, and 16C. When $N \leq 3$, the CPU 32 proceeds to S112 to detect the torque change timing of the B-motor 102. In S112, an average value IBa of currents of the B-motor 102 in a section from the time when $ST=STa$ to the time Ta is calculated.

After that, in S113, the CPU 32 calculates a moving average value IBb of currents of the B-motor 102 in 10 ms for each fixed time. Then, the CPU 32 determines whether the difference between the moving average value IBb and the average value IBa of the B-motor 102 has exceeded a reference value IBc that is a current threshold set in advance. In this operation example, a value obtained by subtracting the average value IBa from the moving average value IBb is compared with the reference value IBc. The reference value IBc may be set on the basis of an experimental value, an analysis value, or the like. That is, in the first embodiment, a change amount of a current value having a correlation with a torque of the B-motor 102 is monitored to detect switching timings of the developing rollers 16Y, 16M, and 16C from a separation state to a contact state.

The CPU 32 proceeds to S114 when $IBb-IBa>IBc$ (YES in S113). In S114, the time when $IBb-IBa>IBc$ is determined as a time Tb. That is, in this case, the time Tb is the timing when the torque of the B-motor 102 has changed by at least a predetermined value. Further, the time Tb corresponds to the time when the developing roller 16 has been brought into contact with the photosensitive member 13 in a case where the contact/separation mechanism 106 is in a normal state. Then, in S114, the number of steps of the D-motor 104 is reset to $ST=0$. After S114, the CPU 32 determines in S115 whether the time difference between the time Ta and the time Tb is at least a predetermined time.

When $IBb-IBa \leq IBc$ (NO in S113), the CPU 32 proceeds to S116. In S116, the CPU 32 determines whether the number of steps ST has reached the number of steps STb at which an unstable region ends. Here, the number of steps STb at which the unstable region ends refers to the number of steps at which the unstable region ends in the driving state of the developing roller 16 in the switching operation of the developing roller 16 from a stop state to a rotation state. That is, when the contact/separation mechanism 106 is in a normal state, the developing roller 16 has been brought into contact with the photosensitive member 13 at the time point when the number of steps ST has reached the number of steps STb at which the unstable region ends.

Note that the determination in S113 is made on the precondition that the torque of the B-motor 102 increases as the developing roller 16 and the photosensitive member 13 are brought into contact with each other in this operation example. However, the application of the present invention is not limited to such a configuration. For example, in a case where the torque of the B-motor 102 decreases as the developing roller 16 and the photosensitive member 13 are brought into contact with each other according to the rotation speeds of the developing roller 16 and the photosensitive member 13, a value obtained by subtracting the moving average value IBb from the average value IBa may be compared with the reference value IBc. The same applies to the processing of S119 that will be described later.

When $ST<STb$ (NO in S116), the CPU 32 returns to S113 and calculates the moving average value IBb again to determine whether the difference between the moving average value IBb and the average value IBa has exceeded the reference value IBc. On the other hand, when ST≥STb (YES in S116), the CPU 32 proceeds to S117 to set Tb to 0 and reset the number of steps ST to 0. When a current value of the B-motor 102 is not detected to have changed by at least a predetermined value at the time point when the number of steps ST has reached STb, it is assumed that any abnormality is caused in the contact operation. For this reason, Tb=0 is set in S117. Since Tb=0 is set in S117, it is determined in the following step that the contact/separation mechanism 106 is in a failure state. Then, the CPU 32 proceeds to S115 to determine whether the time difference between the time Ta and the time Tb is at least the predetermined time. Note that in S117, the contact sequence may end and notify a user of abnormality at the time point when the number of steps ST has reached STb in a state in which the current value of the B-motor 102 is not detected to have changed by at least the predetermined value.

Further, when N≥4 (NO in S111), the developing roller 16 that is under the contact operation is the developing roller 16K. Therefore, when N≥4, the CPU 32 proceeds to S118 to detect the torque change timing of the C-motor 103. In S118, an average value ICa of currents of the C-motor 103 in a section from the time when ST=STa to the time Ta is calculated.

After that, in S119, the CPU 32 calculates a moving average value ICb of currents of the C-motor 103 in 10 ms for each fixed time. Then, the CPU 32 determines whether the difference between the moving average value ICb and the average value ICa of the C-motor 103 has exceeded a reference value ICc that is a threshold set in advance. In this operation example, a value obtained by subtracting the average value ICa from the moving average value ICb is compared with the reference value ICc. The reference value ICc may be set on the basis of an experimental value, an analysis value, or the like. That is, in the first embodiment, a change amount of a current value having a correlation with a torque of the C-motor 103 is monitored to detect a switching timing of the developing roller 16K from a separation state to a contact state.

The CPU 32 proceeds to S114 when ICb–ICa>ICc (YES in S119). In S114, the time when ICb–ICa>ICc is detected is determined as a time Tb. That is, in this case, the time Tb is the timing when the torque of the C-motor 103 has changed by at least a predetermined value. Further, the time Tc corresponds to the time when the developing roller 16K has been brought into contact with the photosensitive member 13K in a case where the contact/separation mechanism 106K is in a normal state. Then, in S114, the number of steps of the D-motor 104 is reset to ST=0. After S114, the CPU 32 determines in S115 whether the time difference between the time Ta and the time Tb is at least a predetermined time.

When ICb–ICa≤ICc (NO in S119), the CPU 32 proceeds to S120. In S120, the CPU 32 determines whether the number of steps ST has reached the number of steps STb at which the unstable region ends. When ST<STb (NO in S120), the CPU 32 returns to S119 and calculates the moving average value ICb again to determine whether the difference between the moving average value ICb and the average value ICa has exceeded the reference value ICc. On the other hand, when ST≥STb (YES in S120), the CPU 32 proceeds to S121 to set Tb to 0 and reset the number of steps ST to 0. Here, a reason for setting Tb=0 is the same as the reason described in S117. Then, the CPU 32 proceeds to S115 to determine whether the time difference between the time Ta and the time Tb is at least the predetermined time.

As described above, the time Ta and the time Tb have been determined before S115. In a case where the contact/separation mechanism 106 is in a normal state, the time Ta is the timing when the torque (current value) of the A-motor 101 has changed by at least a predetermined value, and the time Tb is the timing when the torque (current value) of the B-motor 102 or the C-motor 103 has changed by at least a predetermined value. In S115, determination is made as to whether the difference between the time Ta and the time Tb is at least the reference time Tc that is a threshold set in advance to perform failure detection for the contact/separation mechanism 106. The reference time Tc may be set on the basis of an experimental value, an analysis value, or the like.

When Tb–Ta≥Tc (YES in S115), the CPU 32 determines in S122 that the contact/separation mechanism 106 is in a normal state. This is because it is considered that the switching of the driving state and the contact/separation state of the developing roller 16 has been normally performed when the torque of the B-motor 102 has changed by at least the predetermined value within a predetermined time after the timing when the torque of the A-motor 101 has changed by at least the predetermined value.

On the other hand, when Tb–Ta<Tc (NO in S115), the CPU 32 determines in S123 that the contact/separation mechanism 106 is in a failure state. This is because it is considered that abnormality has been caused in the contact/separation mechanism 106 as described above with reference to FIG. 6B in a case where the timing when the torque of the B-motor 102 or the C-motor 103 has changed by at least the predetermined value is earlier than expected and the value of the time Tb is smaller than expected. Further, even in a case where the torque of the B-motor 102 or the C-motor 103 is not detected to have changed by at least the predetermined value, Tb–Ta<Tc is obtained since Tb=0 is set at S117 or S121, and a failure in the contact/separation mechanism 106 is detected.

Through the operations of S107 to S123 described above, the switching of the driving state and the contact/separation state of one developing roller 16 is performed, and the contact operation is completed. The image forming apparatus 200 has the four cartridges 12Y, 12M, 12C, and 12K. Accordingly, in the contact sequence of the image forming apparatus 200, the operations of S107 to S119 are performed four times in total, and the contact operations of the developing rollers 16Y, 16M, 16C, and 16K are sequentially performed.

Specifically, the CPU 32 proceeds to S124 after S122 or S123 to determine whether N=4. When N=4 is not obained (NO in S124), it is determined that any of the developing rollers 16 that has not completed a contact operation exists. Therefore, the count number N is incremented and updated to N=N+1 in S125. In addition, counting of the number of steps ST is started in S125. Then, the operations of S107 to S119 are similarly performed for another developing roller 16 that has not completed the contact operation. On the other hand, when N=4 (YES in S124), it is determined that all the developing rollers 16 have completed the contact operation. Therefore, the contact sequence ends.

Thus, determination of failures in the contact/separation mechanisms 106 is enabled on the basis of the torque change timing of a motor (the B-motor 102 or the C-motor 103) that drives the photosensitive members 13 according to the configuration of the first embodiment. More specifically, failures in the contact/separation mechanisms 106 are determined on the basis of whether the torque of a motor that drives the photosensitive members 13 is detected to have changed by at least a predetermined value within a predetermined time after the torque change timing of the A-motor 101 associated with the start of rotation of the developing rollers 16.

Further, according to the configuration of the first embodiment, determination of the presence or absence of failures in the contact/separation mechanisms 106 is enabled during a contact sequence in an image forming operation. Therefore, occurrence of downtime is reduced. In addition, according to the configuration of the first embodiment, determination of the presence or absence of failures in the contact/separation mechanisms 106 is enabled without formation of test patterns on the photosensitive members 13. Therefore, an increase in a consumption amount of toner is reduced. Further, a failure determination operation for the contact/separation mechanisms 106 is incorporated in the contact sequence that is a part of the image forming operation. Therefore, failure determination is made periodically and simply.

Note that in the application of the present invention, a user is preferably notified of the fact that the contact/separation mechanisms 106 are in a failure state after the end of a contact sequence or by interruption of the contact sequence when it is determined in S119 that the contact/separation mechanisms 106 are in the failure state. Notification means includes, for example, the display panel 33 or a warning sound. A notification method includes, for example, a method in which information associated with states of the contact/separation mechanisms 106 or recommendation text for prompting replacement of the cartridges 12 or repair of a body is displayed on the display panel 33.

Further, failures in the contact/separation mechanisms 106 are detected in the contact sequence that is a part of an image forming operation in the first embodiment, but the application of the present invention is not limited to such a configuration. For example, the image forming apparatus 200 may perform a contact sequence dedicated to detection of failures in the contact/separation mechanisms 106. With the contact sequence dedicated to the detection of failures, determination of the presence or absence of failures in the contact/separation mechanisms 106 is enabled even at a time other than an image forming operation.

Further, in the first embodiment, the torque change timing of a motor that drives the developing rollers 16 is employed as a reference timing with respect to the torque change timing of a motor that drives the photosensitive members 13 in order to determine the presence or absence of failures in the contact/separation mechanisms 106. However, the application of the present invention is not limited to such a configuration. For example, using the timing when a predetermined time has elapsed since the start timing of rotation of the A-motor 101 as a reference timing, the time difference between the torque change timing of the motor that drives the photosensitive members 13 and the reference timing may be calculated. That is, a predetermined reference timing may be used for determination of failures in the contact/separation mechanisms 106 so long as the timing is independent from the torque change timing of the motor that drives the photosensitive members 13.

Second Embodiment

Next, a second embodiment according to the present invention will be described. The second embodiment is different from the first embodiment in that failures in contact/separation mechanisms 106 are detected in a separation sequence in which developing rollers 16 are separated from photosensitive members 13. Hereinafter, the same configurations as those of the first embodiment will be denoted by the same symbols, and their duplicated descriptions will be omitted in the second embodiment. In the second embodiment, only characteristic configurations will be described. The mechanical configuration of an image forming apparatus 200 according to the second embodiment is the same as that of the first embodiment.

Hereinafter, a failure detection method for the contact/separation mechanisms 106 by the image forming apparatus 200 according to the second embodiment will be described. Note that an operation example of a developing roller 16Y and a contact/separation mechanism 106Y will be mainly described below, but failure detection is also possible in the same manner for developing rollers 16M, 16C, and 16K and contact/separation mechanisms 106M, 106C, and 106K.

In the image forming apparatus 200 according to the second embodiment, failures in the contact/separation mechanisms 106 are detected on the basis of a torque change timing of a B-motor 102 or a C-motor 103 that drives the photosensitive members 13 in the separation operations of the developing rollers 16 that are performed when an image forming operation ends. First, the operations of an A-motor 101 and the B-motor 102 in the separation operation of the developing roller 16Y will be described. FIG. 8A shows the operations of the A-motor 101 and the B-motor 102 in the separation operation performed when the contact/separation mechanism 106Y is in a normal state. FIG. 8B shows the operations of the A-motor 101 and the B-motor 102 in the separation operation performed when the developing roller 16Y is not normally separated due to a failure in the contact/separation mechanism 106Y.

In upper parts of FIGS. 8A and 8B, the driving state and the contact/separation state of the developing roller 16Y that change according to the number of steps of a D-motor 104 are shown. In lower parts of FIGS. 8A and 8B, transitions of rotation speeds, transitions of torques, and transitions of current values of the A-motor 101 and transitions of rotation speeds, transitions of torques, and transitions of current values of the B-motor 102 are shown. In FIGS. 8A and 8B, horizontal axes of graphs that show the transitions of the respective parameters of the motors are times, and the driving states and the contact/separations states of the developing roller 16Y at the times are shown in the upper parts. In the image forming apparatus 200, the current values of the motors are detectable by the current detection portion described above.

Separation Operation of Contact/Separation Mechanism in Normal State

First, the operations of the A-motor 101 and the B-motor 102 in the separation operation of the developing roller 16Y performed when the contact/separation mechanism 106Y is in a normal state will be described with reference to FIG. 8A. When an image forming operation ends, the switching of the developing roller 16Y from a rotation state to a stop state is performed after the switching of the developing roller 16Y from a contact state to a separation state as the separation operation of the developing roller 16Y.

In the separation operation, rotation of the D-motor 104 is first started with rotation of the A-motor 101 and the B-motor 102 continued. In the separation operation, the speeds of the A-motor 101 and the B-motor 102 are controlled so that transition of rotation speeds becomes constant.

When the number of steps of the D-motor 104 reaches a predetermined value, the contact/separation state of the developing roller 16Y becomes unstable in design. Hereinafter, the time when the contact/separation state of the developing roller 16Y becomes unstable will be represented as a time T4.

After that, the developing roller 16Y is separated from a photosensitive member 13Y. Hereinafter, the time when the contact/separation state of the developing roller 16Y is actually switched from a contact state to a separation state will be represented as a time T5. The photosensitive member 13Y does not receive a force from the developing roller 16Y when the developing roller 16Y is separated from the photosensitive member 13Y. Therefore, the torque of the B-motor 102 that drives the photosensitive member 13Y changes at the time T5. At this time, the torque of the B-motor 102 increases if the rotation speed of the developing roller 16Y is faster than the rotation speed of the photosensitive member 13Y. On the other hand, the torque of the B-motor 102 decreases if the rotation speed of the developing roller 16Y is slower than the rotation speed of the photosensitive member 13Y. At the time T5, the current value of the B-motor 102 also changes like the torque of the B-motor 102. Further, the rotation speed of the B-motor 102 could temporarily change at the time T5 as indicated by dotted lines in FIG. 8A.

When the number of steps of the D-motor 104 increases, the driving state of the developing roller 16Y becomes unstable in design. After that, the driving of a mechanical clutch 105Y is switched from a transmission state to a cut-off state. Then, a driving force of the A-motor 101 is not transmitted to the developing roller 16Y via a driving train including the mechanical clutch 105Y, and the developing roller 16Y is switched from a rotation state to a stop state. Hereinafter, the time when the driving state of the developing roller 16Y is actually switched from a stop state to a rotation state will be represented as a time T6.

The torque of the A-motor 101 that drives the developing roller 16Y decreases at the time T6 with the switching of the driving state of the developing roller 16Y. Further, the torque of the A-motor 101 has a correlation with a current value, and the current value of the A-motor 101 also changes at the time T6. Further, the rotation speed of the A-motor 101 could temporarily change at the time T6 as indicated by dotted lines in FIG. 8A.

The separation operation is completed when the developing roller 16Y is switched to the separation state and the stop state through the operations described above. When the contact/separation mechanism 106Y is in a normal state, the timing when the contact/separation state of the developing roller 16Y is switched is the time T5, and the timing when the driving state is switched is the time T6. As for the number of steps of the D-motor 104, a predetermined difference is provided between the number of steps for switching the contact/separation state of the developing roller 16Y and the number of steps for switching the driving state of the developing roller 16Y. Therefore, a predetermined time difference is made between the time T5 and the time T6. That is, when the contact/separation mechanism 106Y is in a normal state, at least a predetermined time difference is made between the torque change timing of the B-motor 102 and the torque change timing of the A-motor 101.

Separation Operation of Contact/Separation Mechanism in Failure State

Next, the operations of the A-motor 101 and the B-motor 102 in the separation operation of the developing roller 16Y performed when the contact/separation mechanism 106Y is in a failure state will be described with reference to FIG. 8B. In this operation example, the developing roller 16Y is not separated from the photosensitive member 13Y in the separation operation due to occurrence of a failure in the contact/separation mechanism 106Y.

In the separation operation, rotation of the D-motor 104 is first started with rotation of the A-motor 101 and the B-motor 102 continued. After that, when the number of steps of the D-motor 104 increases and the time reaches T4 or T5, the developing roller 16Y is not separated from the photosensitive member 13Y since the contact/separation mechanism 106Y is in a failure state in this operation example. Accordingly, the torque and the current value of the B-motor 102 do not change at the time T5.

When the number of steps of the D-motor 104 further increases, the time reaches T6. Then, the developing roller 16Y is switched from a rotation state to a stop state in a state in which the developing roller 16Y and the photosensitive member 13Y are brought into contact with each other. Further, the torque of the A-motor 101 decreases, and the current value of the A-motor 101 also changes. In addition, a force that the photosensitive member 13Y receives from the developing roller 16Y also changes at the timing when the driving state of the developing roller 16Y changes. Accordingly, the torque and the current value of the B-motor 102 also change at the time T6.

As described above, in a case where the photosensitive member 13Y and the developing roller 16Y are brought into contact with each other at all times due to occurrence of a failure in the contact/separation mechanism 106Y, the torque change timing of the A-motor 101 and the torque change timing of the B-motor 102 become almost the same. That is, the torque change timing of the B-motor 102 in the separation operation of the developing roller 16Y varies depending on the presence or absence of occurrence of a failure in the contact/separation mechanism 106Y. Further, a predetermined time difference is made between the torque change timing of the A-motor 101 and the torque change timing of the B-motor 102 in a case where the contact/separation mechanism 106Y is in a normal state, but is not almost generated between the torque change timing of the A-motor 101 and the torque change timing of the B-motor 102 in a case where the contact/separation mechanism 106Y is in a failure state.

Similarly, the torque change timing of the B-motor 102 in a separation operation of the developing roller 16M (16C) varies depending on the presence or absence of occurrence of a failure in the contact/separation mechanism 106M (106C). In a case where the photosensitive member 13M (13C) and the developing roller 16M (16C) are brought into contact with each other at all times due to occurrence of a failure in the contact/separation mechanism 106M (106C), the torque change timing of the A-motor 101 and the torque change timing of the B-motor 102 become almost the same. Further, the torque change timing of the C-motor 103 in a separation operation of the developing roller 16K varies depending on the presence or absence of occurrence of a failure in the contact/separation mechanism 106K. In a case where the photosensitive member 13K and the developing roller 16K are brought into contact with each other at all times due to occurrence of a failure in the contact/separation mechanism 106K, the torque change timing of the A-motor 101 and the torque change timing of the C-motor 103 become almost the same.

Failure Detection Method for Contact/Separation Mechanisms

As described above, the torque change timings of the B-motor 102 and the C-motor 103 in the separation operation vary depending on the presence or absence of occurrence of failures in the contact/separation mechanisms 106. Therefore, in the second embodiment, the presence or absence of occurrence of failures in the contact/separation mechanisms 106 is determined on the basis of the timing when the torque of the B-motor 102 or the C-motor 103 has changed by at least a predetermined value and the timing when the torque of the A-motor 101 has changed by at least a predetermined value in a separation operation. More specifically, in the second embodiment, in a case where the timing when the torque of the B-motor 102 or the C-motor 103 has changed by at least a predetermined value and the timing when the torque of the A-motor 101 has changed by at least a predetermined value are smaller than a predetermined reference value, it is determined that the contact/separation mechanisms 106 are in a failure state. Hereinafter, a specific example of failure detection for the contact/separation mechanisms 106 by the image forming apparatus 200 according to the second embodiment will be described.

In the second embodiment, the image forming apparatus 200 is configured to perform failure detection for the contact/separation mechanisms 106 in a separation sequence of the developing rollers 16 when an image forming operation ends. In the separation sequence, the separation operations of the developing rollers 16Y, 16M, 16C, and 16K are performed. Further, in the second embodiment, current values having a correlation with the torques of the motors are used to detect the torque change timings of the respective motors.

Figure 9:
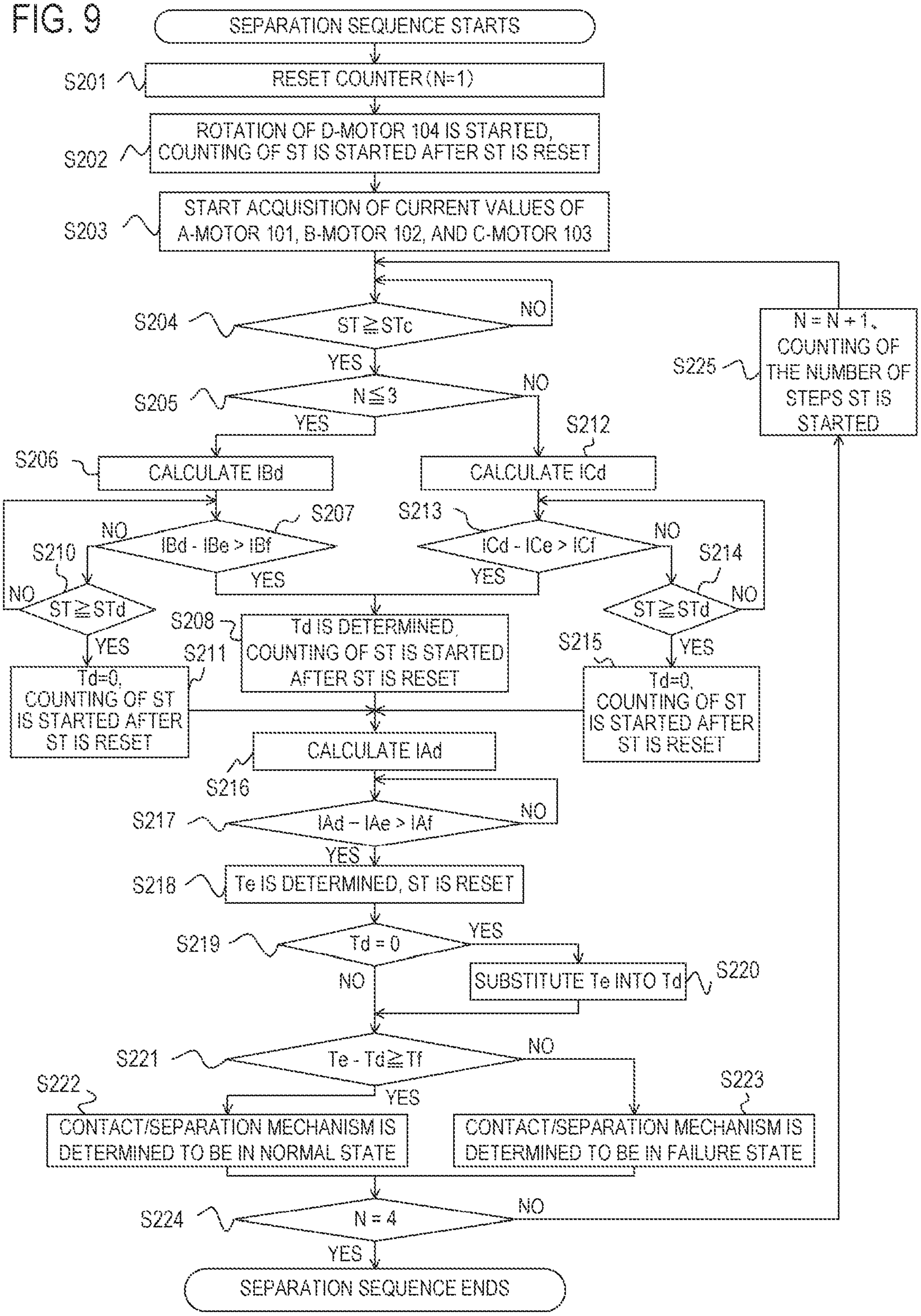
FIG. 9 is a flowchart of a separation sequence according to the second embodiment.

The separation sequence of the developing rollers 16 including failure detection for the contact/separation mechanisms 106 will be described with reference to FIG. 9. FIG. 9 is a flowchart of the separation sequence of the image forming apparatus 200.

When the developing separation sequence starts, the CPU 32 resets a couner to N=1 as an initial setting in S201. Then, in S202, rotation of the D-motor 104 is started, and counting of the number of steps ST is started after the number of steps ST of the D-motor 104 is reset to ST=0.

Next, in S203, the CPU 32 starts acquisition of current values of the A-motor 101, the B-motor 102, and the C-motor 103. Then, the D-motor 104 continues to rotate until the number of steps ST reaches the number of steps STc at which an unstable region starts. Here, the number of steps STc at which the unstable region starts refers to the number of steps at which the unstable region starts in the contact/separation state of a developing roller 16 in the switching operation of the developing roller 16 from a contact state to a separation state.

When the number of steps ST reaches the number of steps Stc at which the unstable region starts to obtain ST≥STc (YES in S204), the CPU 32 determines in S205 whether a count number N is not more than 3.

When N≤3 (YES in S205), the developing roller 16 that is under the separation operation is any of the developing rollers 16Y, 16M, and 16C. When N≤3, the CPU 32 proceeds to S206 to detect the torque change timing of the B-motor 102. In S206, an average value IBd of currents of the B-motor 102 in a section from ST=0 to ST=STc is calculated.

After that, in S207, the CPU 32 calculates a moving average value IBe of currents of the B-motor 102 in 10 ms for each fixed time. Then, the CPU 32 determines whether the difference between the moving average value IBe and the average value IBd of the B-motor 102 has exceeded a reference value IBf that is a current threshold set in advance. In this operation example, a value obtained by subtracting the moving average value IBe from the average value IBd is compared with the reference value IBf. The reference value IBf may be set on the basis of an experimental value, an analysis value, or the like. That is, in the second embodiment, a change amount of a current value having a correlation with a torque of the B-motor 102 is monitored to detect switching timings of the developing rollers 16Y, 16M, and 16C from a contact state to a separation state.

The CPU 32 proceeds to S208 when IBd−IBe>IBf (YES in S207). In S208, the time when IBd−IBe>IBf is detected is determined as a time Td. That is, in this case, the time Td is the timing when the torque of the B-motor 102 has changed by at least a predetermined value. Further, the time Td corresponds to the time when the developing roller 16 has been separated from the photosensitive member 13 in a case where the contact/separation mechanism 106 is in a normal state. Then, in S208, the number of steps ST of the D-motor 104 is reset to 0, and counting of the numbe of steps ST is started. After S208, an average value IAd of currents of the A-motor 101 is calculated in S216.

When IBd−IBe≤IBf (NO in S207), the CPU 32 proceeds to S210. In S210, the CPU 32 determines whether the number of steps ST has reached the number of steps STd at which an unstable region ends. Here, the number of steps STb at which the unstable region ends refers to the number of steps at which the unstable region ends in the contact/separation state of the developing roller 16 in the switching operation of the developing roller 16 from a contact state to a separation state. That is, when the contact/separation mechanism 106 is in a normal state, the developing roller 16 has been separated from the photosensitive member 13 at the time point when the number of steps ST has reached the number of steps STd at which the unstable region ends.

When ST<STd (NO in S210), the CPU 32 returns to S207 and calculates the moving average value IBe again to determine whether the difference between the moving average value IBe and the average value IBd has exceeded the reference value IBc. On the other hand, when ST≥STd (YES in S210), the CPU 32 proceeds to S211 to set Td to 0 and reset the number of steps ST to 0. When a current value of the B-motor 102 is not detected to have changed by at least a predetermined value at the time point when the number of steps ST has reached STd, Td=0 is set in S211 since it is assumed that any abnormality is caused in the separation operation. Since Td=0 is set in S211, it is determined in the following step that the contact/separation mechanism 106 is in a failure state. Then, the CPU 32 proceeds to S216 and calculates the average value IAd of currents of the A-motor 101.

Further, when N≥4 (NO in S205), the developing roller 16 that is under the separation operation is the developing roller 16K. Therefore, when N≥4, the CPU 32 proceeds to S212 to detect the torque change timing of the C-motor 103. In S212, an average value ICd of currents of the C-motor 103 in a section from ST=0 to ST=STc is calculated.

After that, in S213, the CPU 32 calculates a moving average value ICe of currents of the C-motor 103 in 10 ms for each fixed time. Then, the CPU 32 determines whether the difference between the moving average value ICe and the average value ICd of the C-motor 103 has exceeded a reference value ICf that is a threshold set in advance. In this operation example, a value obtained by subtracting the moving average value ICe from the average value ICd is compared with the reference value ICf. The reference value ICf may be set on the basis of an experimental value, an analysis value, or the like. That is, in the second embodiment, a change amount of a current value having a correlation with a torque of the C-motor 103 is monitored to detect a switching timing of the developing roller 16K from a contact state to a separation state.

The CPU 32 proceeds to S208 when ICd−ICe>ICf (YES in S213). In S208, the time when ICd−ICe>ICf is determined as a time Td. That is, in this case, the time Td is the timing when the torque of the C-motor 103 has changed by at least a predetermined value. Further, the time Td corresponds to the time when the developing roller 16K has been separated from the photosensitive member 13K in a case where the contact/separation mechanism 106K is in a normal state. Then, in S208, the number of steps ST of the D-motor 104 is reset to ST=0. After S208, an average value IAd of currents of the A-motor 101 is calculated in S216.

The CPU 32 proceeds to S214 when ICd−ICe≤ICf (NO in S213). In S214, the CPU 32 determines whether the number of steps ST has reached the number of steps STd at which the unstable region ends. When ST<STd (NO in S214), the CPU 32 returns to S213 and calculates the moving average value ICe again to determine whether the difference between the moving average value ICe and the average value ICd has exceeded the reference value ICf. On the other hand, when ST≥STd (YES in S214), the CPU 32 proceeds to S215 to set Td to 0 and reset the number of steps ST to 0. Here, a reason for setting Td=0 is the same as the reason described in S211. Then, the CPU 32 proceeds to S216 and calculates the average value IAd of currents of the A-motor 101.

After that, in S217, the CPU 32 calculates a moving average value IAe of currents of the A-motor 101 in 10 ms for each fixed time. Then, the CPU 32 determines whether the difference between the moving average value IAe and the average value IAd of the A-motor 101 has exceeded a reference value IAf that is a current threshold set in advance. The reference value IAf may be set on the basis of an experimental value, an analysis value, or the like. That is, in the second embodiment, a change amount of a current value having a correlation with a torque of the A-motor 101 is monitored to detect a switching timing of the developing roller 16 from a rotation state to a stop state. During IAd−IAe≤IAf (NO in S217), the CPU 32 determines that the developing roller 16 remains rotated and performs calculation of the moving average value IAe for each fixed time and comparison between the difference between the moving average value IAe and the average value IAd and the reference value IAf.

When the D-motor 104 continues to rotate to obtain IAd−IAe>IAf (YES in S217), the time when IAd−IAe>IAf is determined as a time Te in S218. That is, the time Te is the timing when the torque of the A-motor 101 has changed by at least a predetermined value. Further, the time Te corresponds to the time when the developing roller 16 has started its rotation by a driving force of the A-motor 101. Then, in S218, the number of steps ST is reset to to ST=0.

After that, the CPU 32 determines in S219 whether Td=0. When Td=0 (YES in S219), the CPU 32 proceeds to S220 to substitite the time Te into the time Td. That is, Td=Te is set in S220. The CPU 32 proceeds to S221 after S220 or when Td is not zero (NO in S219).

As described above, the time Td and the time Te have been determined before S221. In a case where the contact/separation mechanism 106 is in a normal state, the time Td is the timing when the torque (current value) of the B-motor 102 or the C-motor 103 has changed by at least a predetermined value, and the time Te is the timing when the torque (current value) of the A-motor 101 has changed by at least a predetermined value. In order to perform failure detection for the contact/separation mechanism 106, determination is made in S221 as to whether the difference between the time Td and the time Te is at least a reference time Tf that is a threshold set in advance. The reference time Tf may be set on the basis of an experimental value, an analysis value, or the like.

When Te−Td≥Tf (YES in S221), the CPU 32 determines in S222 that the contact/separation mechanism 106 is in a normal state. This is because it is considered that the switching of he driving state and the contact/separation state of of the developing roller 16 has been normally performed in a case where the difference between the timing when the torque of the B-motor 102 has changed by at least the predetermined value and the timing when the torque of the A-motor 101 has changed by at least the predetermined value is smaller than a predetermined reference value.

On the other hand, when Te−Td<Tf (NO in S221), the CPU 32 determines in S222 that the contact/separation mechanism 106 is in a failure state. This is because it is considered that abnormality has been caused in the contact/separation mechanism 106 as described above with reference to FIG. 8B in a case where the timing when the torque of the B-motor 102 or the C-motor 103 has changed by at least the predetermined value is slower than expected and the value of the time Td is larger than expected. Further, even in a case where the torque of the B-motor 102 or the C-motor 103 is not detected to have changed by at least the predetermined value, Te−Td=0<Tf is obtained since Td=Te is set at S220, and a failure in the contact/separation mechanism 106 is detected.

Through the operations of S204 to S223 described above, the switching of the driving state and the contact/separation state of one developing roller 16 is performed, and the separation operation is completed. The image forming apparatus 200 has four cartridges 12Y, 12M, 12C, and 12K. Accordingly, in the separation sequence of the image forming apparatus 200, the operations of S204 to S223 are performed four times in total, and the separation operations of the developing rollers 16Y, 16M, 16C, and 16K are sequentially performed.

Specifically, the CPU 32 proceeds to S224 after S222 or S223 to determine whether N=4. When N=4 is not obained (NO in S224), it is determined that any of the developing rollers 16 that has not completed a separation operation exists. Therefore, the count number N is incremented and updated to N=N+1 in S225. In addition, counting of the number of steps ST is started in S225. Then, the operations of S204 to S223 are similarly performed for another developing roller 16 that has not completed the separation operation. On the other hand, when N=4 (YES in S224), it is determined that all the developing rollers 16 have completed the separation operation. Therefore, the separation sequence ends.

Thus, determination of failures in the contact/separation mechanisms 106 is enabled on the basis of the torque change timing of a motor (the B-motor 102 or the C-motor 103) that drives the photosensitive members 13 according to the configuration of the second embodiment. More specifically, failures in the contact/separation mechanisms 106 are determined on the basis of whether the difference between the timing when the torque of a motor that drives the photosensitive members 13 has changed by at least a predetermined value and the timing when a motor that drives the developing rollers 16 has changed by at least a predetermined value is smaller than a predetermined reference value.

Further, according to the configuration of the second embodiment, determination of the presence or absence of failures in the contact/separation mechanisms 106 is enabled during a separation sequence in an image forming operation.

Therefore, occurrence of downtime is reduced. In addition, according to the configuration of the second embodiment, determination of the presence or absence of failures in the contact/separation mechanisms 106 is enabled without formation of test patterns on the photosensitive members 13. Therefore, an increase in a consumption amount of toner is reduced. Further, a failure determination operation for the contact/separation mechanisms 106 is incorporated in the separation sequence that is a part of the image forming operation. Therefore, failure determination is made periodically and simply.

Further, in the second embodiment, the torque change timing of a motor that drives the developing rollers 16 is employed as a reference timing with respect to the torque change timing of a motor that drives the photosensitive members 13 in order to determine the presence or absence of failures in the contact/separation mechanisms 106. However, the application of the present invention is not limited to such a configuration. For example, using the timing when a predetermined time has elapsed since the start timing of a separation sequence as a reference timing, the time difference between the torque change timing of the motor that drives the photosensitive members 13 and the reference timing may be calculated. That is, a predetermined reference timing may be used for determination of failures in the contact/separation mechanisms 106 so long as the timing is independent from the torque change timing of the motor that drives the photosensitive members 13.

Other Modified Examples

Note that the difference between an average value of currents in a predetermined section and an average value of currents in a different predetermined section of the A-motor 101 is compared with a threshold to detect the change timing of a current value of the A-motor 101 in the respective embodiments described above. However, the application of the present invention is not limited to such a configuration. The change timing of the current value of the A-motor 101 may be detected by a different method. The same applies to detection of the change timing of a current value of the B-motor 102 or the C-motor 103.

Further, the change timing of a current value of a motor is detected in order to detect the torque change timing of the motor in the respective embodiments described above. However, the application of the present invention is not limited to such a configuration. For example, in order to detect the torque change timing of a motor, other parameters having a correlation with the torque of the motor may be monitored, or a transition of the rotation speed of the motor or a positional deviation with respect to an ideal position may be used. That is, a known torque detection method by which it is possible to detect the fact that a torque of a motor has changed by at least a predetermined value may be used in the application of the present invention.

Further, the driving states or the contact/separation states of the developing rollers 16 are determined according to the number of steps of the D-motor 104 in the respective embodiments described above. However, the application of the present invention is not limited to such a configuration. That is, the present invention may only be applied to a driving mechanism in which switching timings of the driving states and the contact/separation states of the developing rollers 16 are made different in design by a combination of solenoids, clutches, or the like and mechanical structures. That is, the present invention is applicable to a configuration in which the time difference between the switching timings of the driving states and the contact/separation states of the developing rollers 16 changes depending on the presence or absence of failures in the contact/separation mechanisms 106.

Further, the processing described as being performed by one apparatus in the respective embodiments may be borne and performed by a plurality of apparatuses in the application of the present invention. Alternatively, the processing described as being performed by different apparatuses may be performed by one apparatus. In a computer system, it is possible to flexibly change a method for realizing respective functions by a hardware configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-062970, filed on Apr. 7, 2023, which is hereby incorporated by reference herein in its entirety.

What is claimed is:

1. An image forming apparatus comprising:
- a photosensitive member;
- a developing roller;
- a contact/separation mechanism configured to switch between a contact state in which the developing roller is brought into contact with the photosensitive member and a separation state in which the developing roller is separated from the photosensitive member;
- a photosensitive-member motor configured to rotate and drive the photosensitive member;
- a developing motor configured to rotate and drive the developing roller;
- a driving train switchable to a driving transmission state in which a driving force is transmitted from the developing motor to the developing roller or a driving cut-off state in which the driving force is not transmitted from the developing motor to the developing roller;
- a stepping motor configured to perform switching of the developing roller between the contact state and the separation state and switching of the driving train between the driving transmission state and the driving cut-off state; and
- a control portion, wherein
  - the control portion is configured to determine that the contact/separation mechanism is in a failure state in a case where a torque of the photosensitive-member motor is not detected to have changed by at least a predetermined value within a predetermined time after a predetermined reference timing, and
  - the predetermined reference timing is a timing at which a torque of the developing motor has changed by at least a predetermined value.

2. The image forming apparatus according to claim 1, wherein
- the predetermined reference timing is a timing at which the driving train is switched from the driving cut-off state to the driving transmission state.

3. An image forming apparatus comprising:
- a photosensitive member;
- a developing roller;
- a contact/separation mechanism configured to switch between a contact state in which the developing roller is brought into contact with the photosensitive member and a separation state in which the developing roller is separated from the photosensitive member;

a photosensitive-member motor configured to rotate and drive the photosensitive member; and a control portion, wherein the control portion is configured to determine that the contact/separation mechanism is in a failure state in a case where a difference between (i) a timing at which a torque of the photosensitive-member motor has changed by at least a predetermined value and (ii) a predetermined reference timing is less than a predetermined reference value.

4. The image forming apparatus according to claim 3, further comprising:

a developing motor that rotates and drives the developing roller, wherein the predetermined reference timing is a timing at which a torque of the developing motor has changed by at least a predetermined value.

5. The image forming apparatus according to claim 4, further comprising:

a driving train switchable to a driving transmission state in which a driving force is transmitted from the developing motor to the developing roller or a driving cut-off state in which the driving force is not transmitted from the developing motor to the developing roller; and a stepping motor configured to perform switching of the developing roller between the contact state and the separation state and switching of the driving train between the driving transmission state and the driving cut-off state.

6. The image forming apparatus according to claim 5, wherein the predetermined reference timing is a timing at which the driving train is switched from the driving transmission state to the driving cut-off state.

7. An image forming apparatus comprising:

a photosensitive member;

a developing roller;

a contact/separation mechanism configured to switch between a contact state in which the developing roller is brought into contact with the photosensitive member and a separation state in which the developing roller is separated from the photosensitive member;

a photosensitive-member motor configured to rotate and drive the photosensitive member; and a control portion, wherein the control portion is configured to provide notification of information associated with a state of the contact/separation mechanism by a notifier in a case where a difference between (i) a timing at which a torque of the photosensitive-member motor has changed by at least a predetermined value and (ii) a predetermined reference timing is less than a predetermined reference value.

8. The image forming apparatus according to claim 7, wherein the information associated with the state of the contact/separation mechanism includes information associated with presence or absence of a failure in the contact/separation mechanism.

9. The image forming apparatus according to claim 7, wherein the notifier is a display panel.

10. The image forming apparatus according to claim 3, further comprising:

a current detection portion configured to detect a current flowing to winding of the photosensitive-member motor, wherein the control portion is configured to detect a timing at which a current of the photosensitive-member motor has changed by at least a predetermined value as a timing at which the torque of the photosensitive-member motor has changed by at least the predetermined value.

11. The image forming apparatus according to claim 10, wherein the photosensitive-member motor is a brushless motor.

12. The image forming apparatus according to claim 7, further comprising:

a current detection portion configured to detect a current flowing to winding of the photosensitive-member motor, wherein the control portion is configured to detect a timing at which a current of the photosensitive-member motor has changed by at least a predetermined value as a timing at which the torque of the photosensitive-member motor has changed by at least the predetermined value.

13. The image forming apparatus according to claim 12, wherein the photosensitive-member motor is a brushless motor.

* * * * *